(12) United States Patent
Kim

(10) Patent No.: US 11,587,497 B2
(45) Date of Patent: Feb. 21, 2023

(54) IMAGE DISPLAY APPARATUS

(71) Applicant: LG ELECTRONICS INC., Seoul (KR)

(72) Inventor: Dohoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/456,343

(22) Filed: Nov. 23, 2021

(65) Prior Publication Data
US 2022/0165204 A1    May 26, 2022

(30) Foreign Application Priority Data

Nov. 26, 2020    (KR) .................. 10-2020-0161467

(51) Int. Cl.
*G09G 3/34* (2006.01)
*G09G 3/20* (2006.01)

(52) U.S. Cl.
CPC ......... *G09G 3/2096* (2013.01); *G09G 3/3426* (2013.01); *G09G 2320/066* (2013.01); *G09G 2330/021* (2013.01); *G09G 2330/025* (2013.01); *G09G 2330/06* (2013.01)

(58) Field of Classification Search
CPC .............. G09G 3/2096; G09G 3/3426; G09G 2330/021; G09G 2330/025; G09G 2330/06
See application file for complete search history.

(56) References Cited

U.S. PATENT DOCUMENTS

| | | | | |
|---|---|---|---|---|
| 9,612,637 | B1* | 4/2017 | Hoffman | H02M 3/1584 |
| 2005/0041438 | A1* | 2/2005 | Chen | H02M 7/5387 |
| | | | | 363/17 |
| 2008/0218504 | A1* | 9/2008 | Yoon | G09G 3/296 |
| | | | | 345/211 |
| 2013/0002165 | A1* | 1/2013 | Rouvala | H05B 45/375 |
| | | | | 315/294 |
| 2020/0186046 | A1* | 6/2020 | Tanaka | H02M 1/32 |

OTHER PUBLICATIONS

European Patent Office Application Serial No. 21208949.4, Search Report dated Apr. 22, 2022, 13 pages.
Firmansyah et al., "A Critical-Conduction-Mode Bridgeless Interleaved Boost Power Factor Correction," Dept. of EESE, Grad. School of ISEE, Kyushu University, Oct. 2009, 5 pages.

(Continued)

*Primary Examiner* — Towfiq Elahi
(74) *Attorney, Agent, or Firm* — Lee, Hong, Degerman, Kang & Waimey PC

(57) ABSTRACT

An image display apparatus is disclosed. The image display apparatus includes a display and a power supply configured to supply driving voltage to the display, wherein the power supply includes a converter to convert input AC voltage into DC voltage and a controller to control the converter, the converter includes a first leg including a first switching device and a second switching device connected to each other in series and a second leg including a first diode and a second diode connected to each other in series, the first diode and the second diode connected to the first leg in parallel, and the controller controls on time of the first switching device to gradually increase from a first level to a second level for a first period for which the input AC voltage rises after a zero crossing point.

20 Claims, 31 Drawing Sheets

(56) References Cited

OTHER PUBLICATIONS

Firmansyah et al., "Totem-Pole Power-Factor-Correction Converter under Critical-Conduction-Mode Interleaved Operation," IEICE Transaction Communication vol. E93-B, Sep. 2010, 7 pages.
Naradhipa et al., "A New Single-Stage Bridgeless Boost Half-Bridge AC/DC Converter with Semi-Active-Rectifier," IEEE, Department of Electrical and information Engineering, Seoul National University of Science and Technology , Mar. 2019, 6 pages.

* cited by examiner

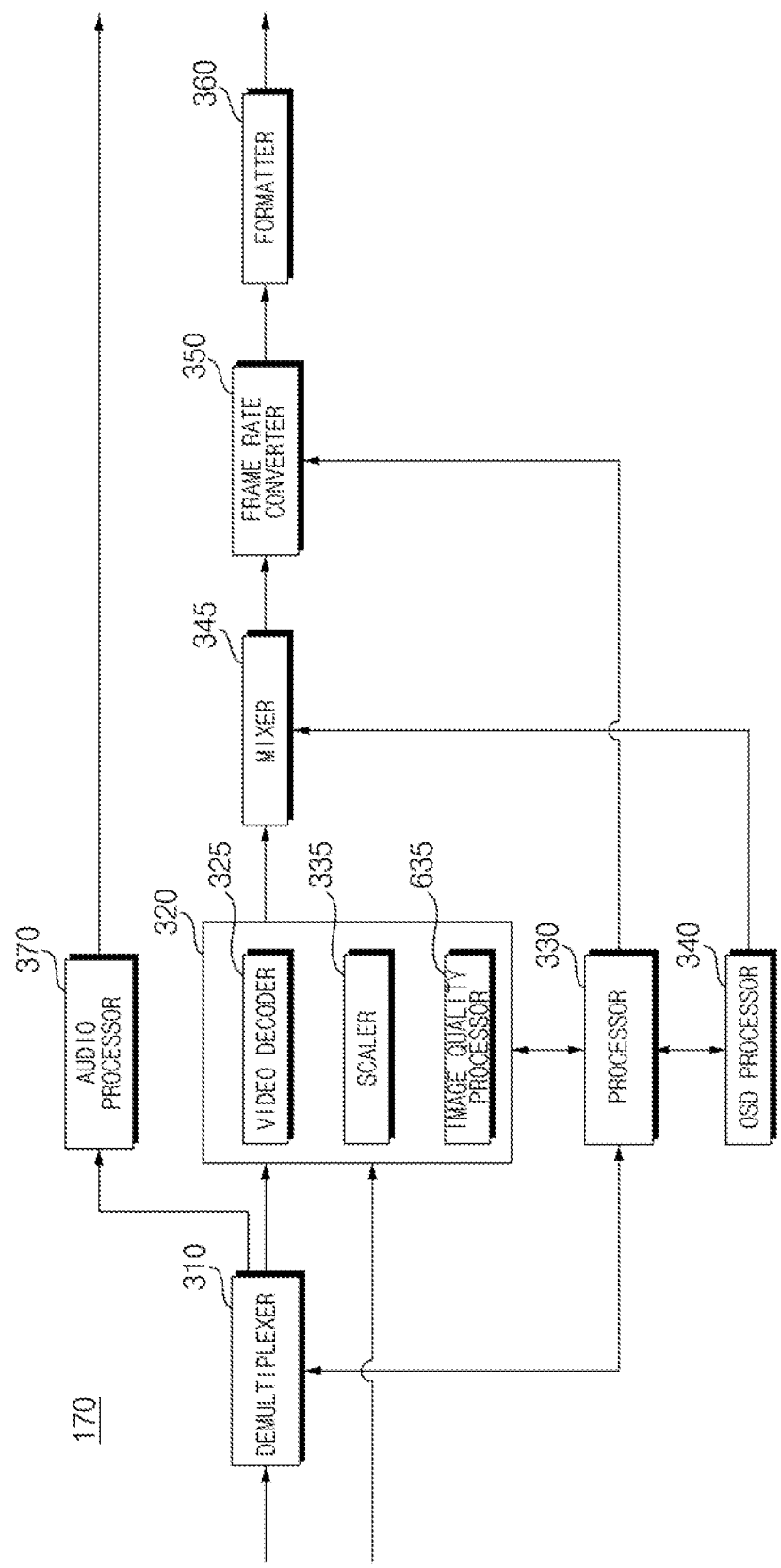

FIG. 15A
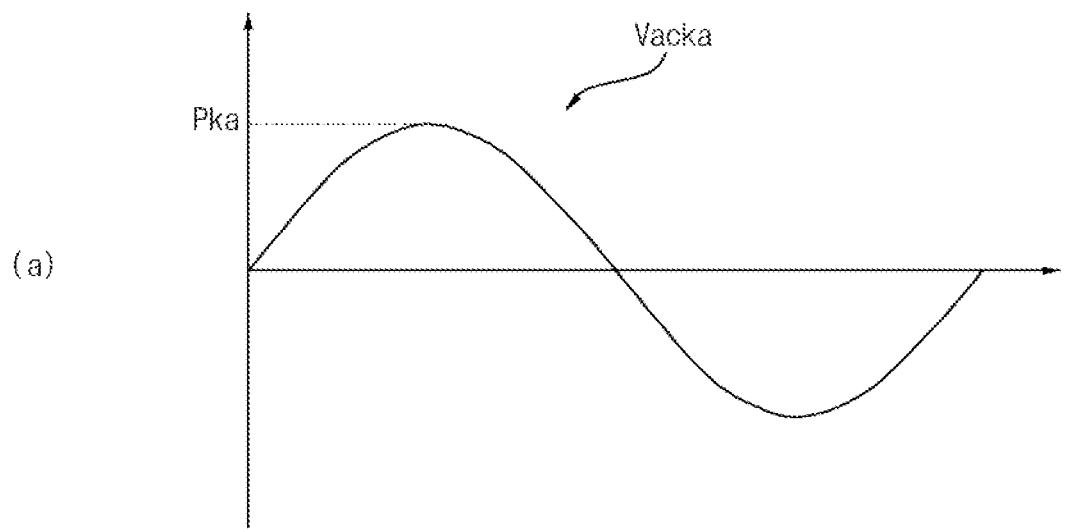
(a)
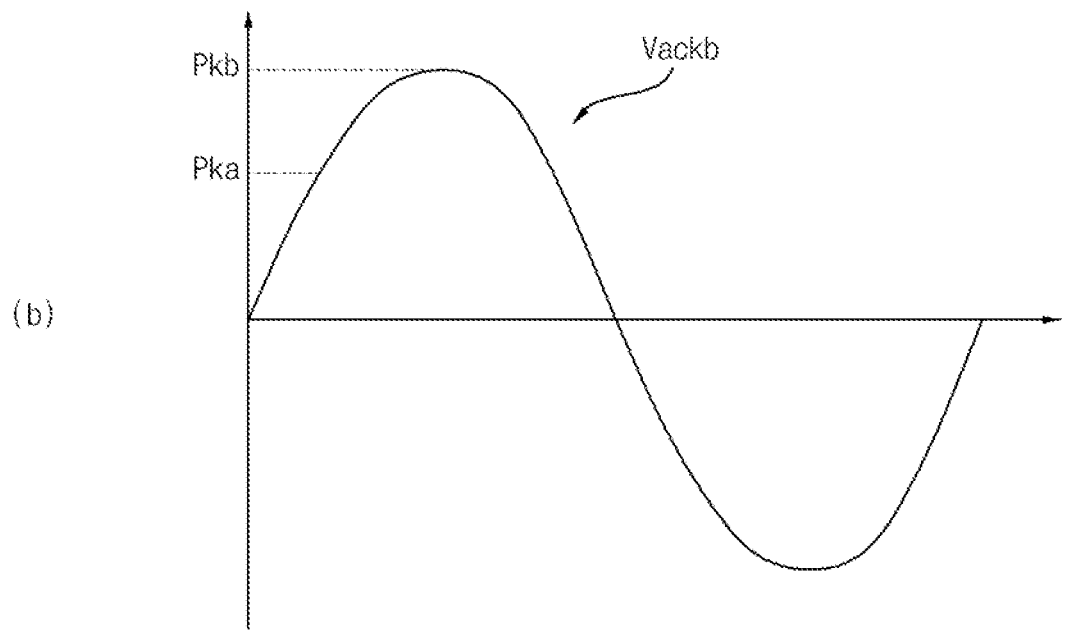
(b)

FIG. 15B
(a) 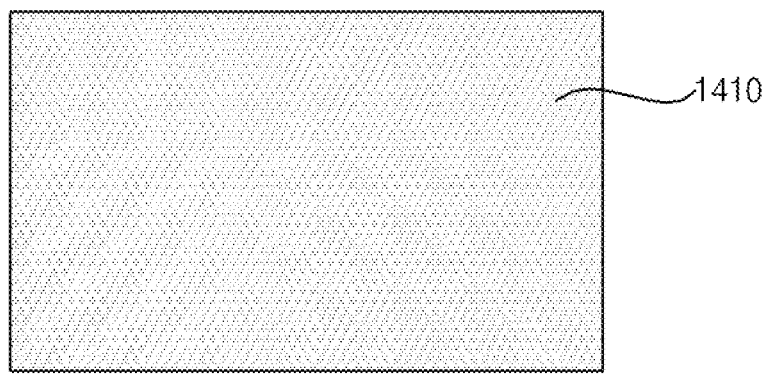
(a) 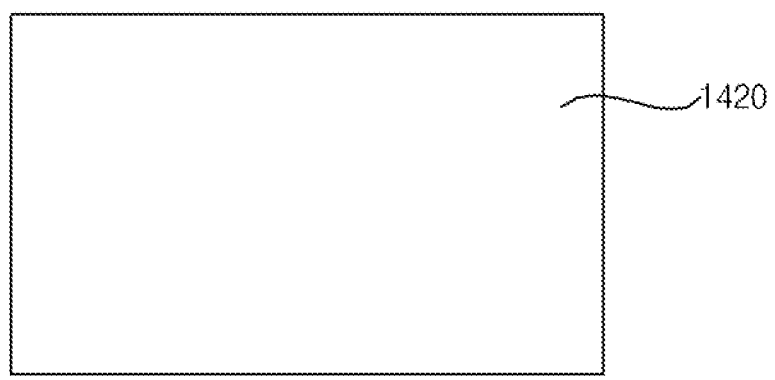

IMAGE DISPLAY APPARATUS

CROSS-REFERENCE TO RELATED APPLICATION

Pursuant to 35 U.S.C. § 119(a), this application claims the benefit of earlier filing date and right of priority to Korean Patent Application No. 10-2020-0161467, filed on Nov. 26, 2020, the contents of which are hereby incorporated by reference herein in its entirety.

BACKGROUND OF THE DISCLOSURE

Field of the Disclosure

The present disclosure relates to an image display apparatus, and more particularly to an image display apparatus capable of reducing noise due to the supply of power.

Description of the Related Art

An image display apparatus is an apparatus that displays an image.

In response to recent demand for increasing resolution and definition of an image, the resolution of a display in an image display apparatus has been increased.

For example, the resolution of the display has been increased to 2K, 4K, 8K, and 16K.

Meanwhile, as the resolution of the display is increased, power consumption of the display is also increased.

Meanwhile, in order to reduce power consumption, efficiency of power that is supplied is important, and therefore there is a plan for efficiently supplying high power.

SUMMARY

An object of the present disclosure is to provide an image display apparatus capable of reducing noise due to the supply of power.

Another object of the present disclosure is to provide an image display apparatus capable of reducing noise at the time of switching a converter configured to supply power to a display.

In accordance with an aspect of the present disclosure, the above and other objects can be accomplished by the provision of an image display apparatus including a display and a power supply configured to supply driving voltage to the display, wherein the power supply includes a converter to convert input AC voltage into DC voltage and a controller to control the converter, wherein the converter includes a first leg including a first switching device and a second switching device connected to each other in series and a second leg including a first diode and a second diode connected to each other in series, the first diode and the second diode connected to the first leg in parallel, and wherein the controller controls on time of the first switching device to gradually increase from a first level to a second level for a first period for which the input AC voltage rises after a zero crossing point.

The controller may control on time of the first switching device to gradually decrease from the second level to the first level for a second period for which the input AC voltage falls after a peak point.

The controller may control on time of the second switching device to gradually increase from the first level to the second level for a third period for which the input AC voltage falls after a zero crossing point.

The controller may control on time of the second switching device to gradually decrease from the second level to the first level for a fourth period for which the input AC voltage rises after the lowest point.

The power supply may further include an input voltage detector to detect the input AC voltage and an output voltage detector to detect output voltage of the converter, and the controller may control the on time of the first switching device to change based on the input AC voltage and the output voltage for a period between the first period and the second period.

The controller may control the on time of the first switching device to decrease as the peak level of the input AC voltage increases.

The controller may control the on time of the first switching device to decrease, as the level of output voltage of the converter decreases.

The power supply may further include an input voltage detector to detect the input AC voltage and an output voltage detector to detect output voltage of the converter, and the controller may control the on time of the second switching device to change based on the input AC voltage and the output voltage for a period between the third period and the fourth period.

The controller may control to decrease the rising slope from the first level to the second level or decrease the second level, as the peak of input current corresponding to the input AC voltage increases for the first period.

The controller may control to decrease the rising slope from the first level to the second level or decrease the second level, as the peak value of the input AC voltage increases.

The controller may control the rising slope from the first level to the second level or the second level when a white image is displayed on the display to be less than the rising slope from the first level to the second level or the second level when a black image is displayed on the display.

The controller may control to decrease the rising slope from the first level to the second level or decrease the second level, as luminance of an image displayed on the display increases.

A load including the display may be connected to an output end of the converter, and the controller may control to decrease the rising slope from the first level to the second level or decrease the second level, as power consumption of the load increases.

The power supply may further include a DC/DC converter connected to the output end of the converter, the DC/DC converter being configured to convert the level of DC voltage, and the load may include a DC/DC converter and the display.

The controller may calculate the maximum on time of the first switching device based on the input AC voltage, may calculate the on time of the first switching device based on output voltage of an output end of the converter, and may output a first switching control signal for driving the first switching device based on the maximum on time and the on time.

The controller may output the first switching control signal for driving the first switching device based on the on time in case in which the maximum on time is greater than the on time, and may output the first switching control signal for driving the first switching device based on the maximum on time in case in which the on time is greater than the maximum on time.

The controller may control maximum on time of the first switching device to gradually increase based on the input AC voltage for the first period, and may control the maximum on time of the first switching device to gradually decrease based on the input AC voltage for the second period.

The controller may control the on time of the first switching device based on the input AC voltage and output voltage of an output end of the converter for a period between the first period and the second period.

The display may include a liquid crystal panel and a backlight including a plurality of light sources configured to emit light to the liquid crystal panel.

The display may include an organic light emitting diode panel including a plurality of light sources.

In accordance with another aspect of the present disclosure, there is provided an image display apparatus including a display and a power supply configured to supply driving voltage to the display, wherein the power supply includes a converter to convert input AC voltage into DC voltage and a controller to control the converter, wherein the converter includes a first leg including a first switching device and a second switching device connected to each other in series and a second leg including a first diode and a second diode connected to each other in series, the first diode and the second diode connected to the first leg in parallel, and wherein the controller is configured to calculate the maximum on time of the first switching device based on the input AC voltage, to calculate on time of the first switching device based on output voltage of an output end of the converter, and to output a first switching control signal for driving the first switching device based on the maximum on time and the on time.

In accordance with a further aspect of the present disclosure, there is provided an image display apparatus including a display and a power supply configured to supply driving voltage to the display, wherein the power supply includes a converter to convert input AC voltage into DC voltage and a controller to control the converter, wherein the converter includes a first leg including a first switching device and a second switching device connected to each other in series and a second leg including a first diode and a second diode connected to each other in series, the first diode and the second diode connected to the first leg in parallel, and wherein the controller is configured to control the maximum on time of the first switching device to gradually increase for a first period for which the positive-polarity input AC voltage rises and to control the maximum on time of the first switching device to gradually decrease based on the input AC voltage for a second period for which the positive-polarity input AC voltage falls.

BRIEF DESCRIPTION OF THE DRAWINGS

The embodiments will be described in detail with reference to the following drawings in which like reference numerals refer to like elements wherein:

FIG. 3 is an example of an internal block diagram of a signal processor of FIG. 2;

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
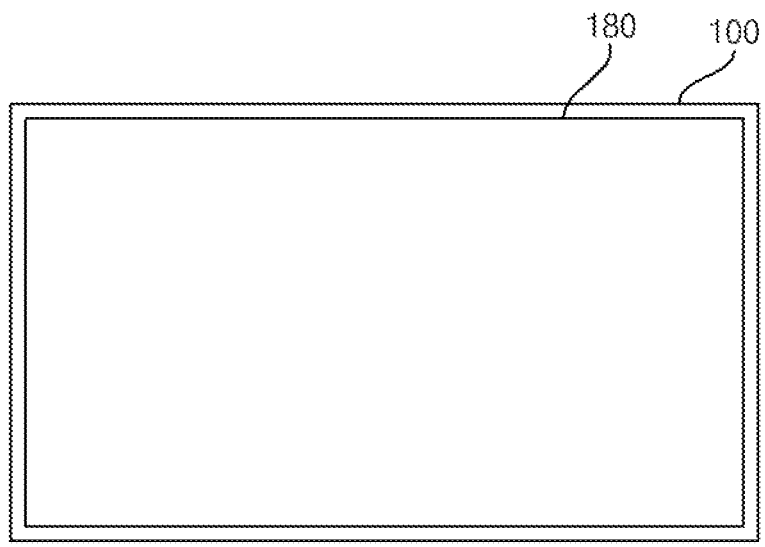
FIG. 1 is a diagram showing an image display apparatus according to an embodiment of the present disclosure.

FIG. 1 is a diagram showing an image display apparatus according to an embodiment of the present disclosure.

Referring to the figure, the image display apparatus 100 may include a display 180.

The resolution of the display 180 has been increased to 2K, 4K, 8K, and 16K. As a result, power consumption of the display 180 is also increased.

Meanwhile, the display 180 may be implemented with any one of various panels. For example, the display 180 may be any one of a liquid crystal display panel (LCD panel), an organic light emitting diode panel (OLED panel), and an inorganic light emitting diode panel (LED panel).

The liquid crystal display panel may further require a separate backlight in addition to a panel configured to display an image.

In the image display apparatus 100 according to the embodiment of the present disclosure, on time of a switching device is gradually increased or decreased at the time of switching a converter 700 (see FIG. 9) configured to supply power to the liquid crystal display panel in the display 180. Consequently, it is possible to reduce noise due to the supply of power. In particular, it is possible to reduce noise at the time of switching the converter 700 configured to supply power to the display 180.

The organic light emitting diode panel or the inorganic light emitting diode panel requires no separate backlight in order to display an image.

In the image display apparatus 100 according to the embodiment of the present disclosure, on time of the switching device is gradually increased or decreased at the time of switching the converter 700 (see FIG. 9) configured to supply power to the organic light emitting diode panel or the inorganic light emitting diode panel in the display 180. Consequently, it is possible to reduce noise due to the supply of power. In particular, it is possible to reduce noise at the time of switching the converter 700 configured to supply power to the display 180.

Meanwhile, the image display apparatus 100 in FIG. 1 may be a TV, a monitor, a tablet PC, a mobile terminal, etc.

Figure 2:
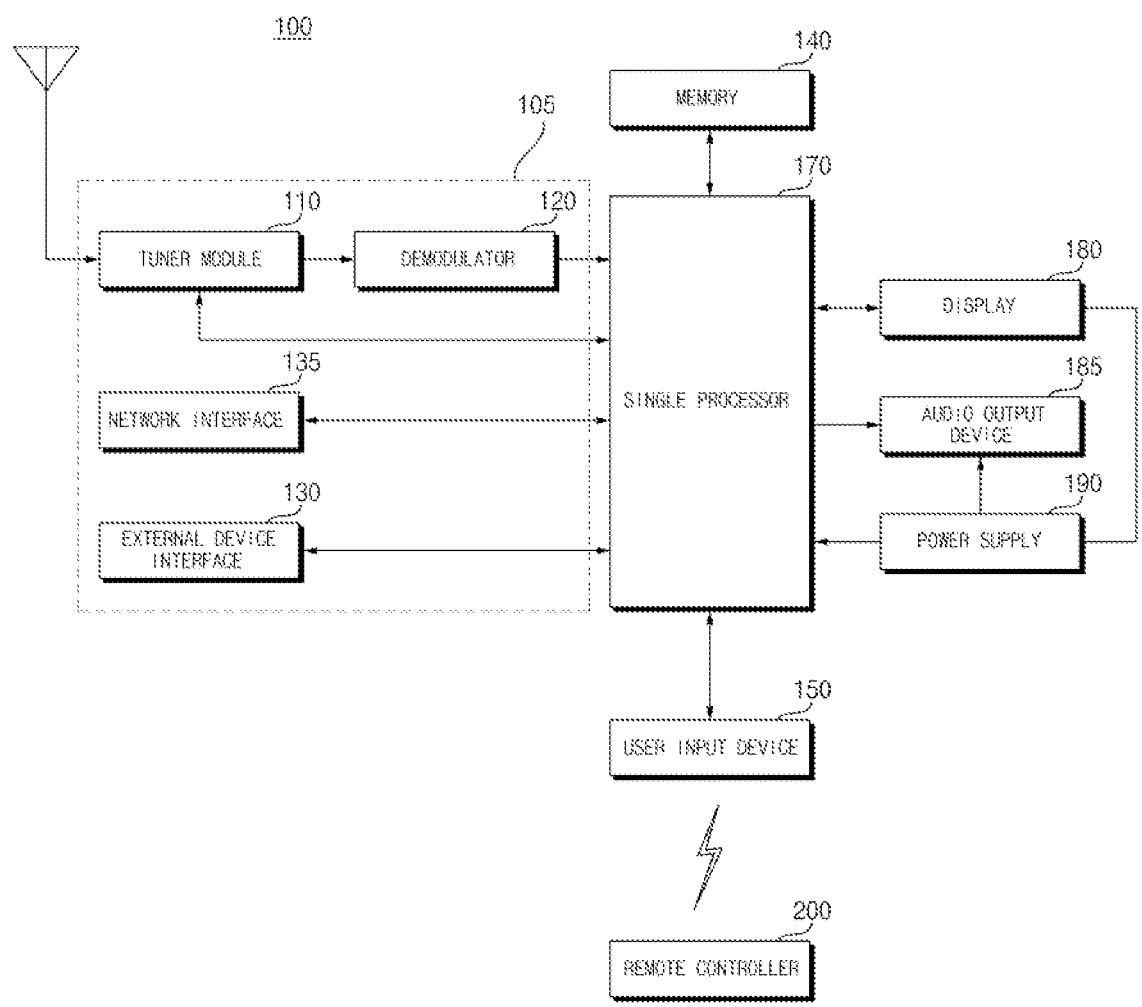
FIG. 2 is an example of an internal block diagram of the image display apparatus of FIG. 1.

FIG. 2 is an example of an internal block diagram of the image display apparatus of FIG. 1.

Referring to FIG. 2, an image display apparatus 100 according to an embodiment of the present disclosure includes an image receiver 105, an external device interface 130, a memory 140, a user input device 150, a sensor unit (not shown), a signal processor 170, a display 180, and an audio output device 185.

The image receiver 105 may include a tuner module 110, a demodulator 120, a network interface 135, and an external device interface 130.

Meanwhile, unlike the drawing, the image receiver 105 may include only the tuner module 110, the demodulator 120, and the external device interface 130. That is, the network interface 135 may not be included.

The tuner module 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner module 110 can process a digital broadcast signal or an analog broadcast signal. The analog baseband image or audio signal (CVBS/SIF) output from the tuner module 110 may be directly input to the signal processor 170.

Meanwhile, the tuner module 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner module 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output device 185.

The external device interface 130 may transmit or receive data with a connected external device (not shown), e.g., a set-top box 50. To this end, the external device interface 130 may include an A/V input and output unit (not shown).

The external device interface 130 may be connected in wired or wirelessly to an external device such as a digital versatile disk (DVD), a Blu ray, a game equipment, a camera, a camcorder, a computer (note book), and a set-top box, and may perform an input/output operation with an external device.

The A/V input and output unit may receive image and audio signals from an external device. Meanwhile, a wireless communicator (not shown) may perform short-range wireless communication with other electronic apparatus.

Through the wireless communicator (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the signal processor 170, and may store signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input device 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor unit (not shown) that senses a user's gesture to the signal processor 170, or may transmit a signal from the signal processor 170 to the sensor unit (not shown).

The signal processor 170 may demultiplex the input stream through the tuner module 110, the demodulator 120, the network interface 135, or the external device interface 130, or process the demultiplexed signals to generate and output a signal for image or audio output.

For example, the signal processor 170 receives a broadcast signal received by the image receiver 105 or an HDMI signal, and performs signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external device interface 130.

The audio signal processed by the signal processor 170 may be output to the audio output device 185 as an audio signal. In addition, audio signal processed by the signal processor 170 may be input to the external output apparatus through the external device interface 130.

Although not shown in FIG. 2, the signal processor 170 may include a demultiplexer, an video processor, and the like. That is, the signal processor 170 may perform a variety of signal processing and thus it may be implemented in the form of a system on chip (SOC). This will be described later with reference to FIG. 3.

In addition, the signal processor 170 can control the overall operation of the image display apparatus 100. For example, the signal processor 170 may control the tuner module 110 to control the tuning of the RF broadcast corresponding to the channel selected by the user or the previously stored channel.

In addition, the signal processor 170 may control the image display apparatus 100 according to a user command input through the user input device 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processor 170 may recognize the position of the user based on the image photographed by a photographing unit (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external device interface 130.

Meanwhile, the display 180 may be configured as a touch screen and used as an input device in addition to an output device.

The audio output device 185 receives a signal processed by the signal processor 170 and outputs it as an audio.

The photographing unit (not shown) photographs a user. The photographing unit (not shown) may be implemented by a single camera, but the present disclosure is not limited thereto and may be implemented by a plurality of cameras. Image information photographed by the photographing unit (not shown) may be input to the signal processor 170.

The signal processor 170 may sense a gesture of the user based on each of the images photographed by the photographing unit (not shown), the signals detected from the sensor unit (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include a converter to convert AC voltage into DC voltage and a DC/DC converter to convert the level of the DC voltage.

The remote controller 200 transmits the user input to the user input device 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input device 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

FIG. 3 is an example of an internal block diagram of the signal processor of FIG. 2.

Referring to the figure, a signal processor 170 according to an embodiment of the present disclosure may include a demultiplexer 310, an video processor 320, a processor 330, and an audio processor 370. In addition, the signal processor 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner module 110, the demodulator 120, or the external device interface 130.

The video processor 320 may perform signal processing on an input image. For example, the video processor 320 may perform image processing on an image signal demultiplexed by the demultiplexer 310.

To this end, the video processor 320 may include an video decoder 325, a scaler 335, an image quality processor 635, an video encoder (not shown), an OSD processor 340, a frame rate converter 350, a formatter 360, etc.

The video decoder 325 decodes a demultiplexed image signal, and the scaler 335 performs scaling so that the resolution of the decoded image signal can be output from the display 180.

The video decoder 325 can include a decoder of various standards. For example, a 3D video decoder for MPEG-2, H.264 decoder, a color image, and a depth image, and a decoder for a multiple view image may be provided.

The scaler 335 may scale an input image signal decoded by the video decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the video decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The frame rate converter (FRC) 350 may convert the frame rate of an input image. Meanwhile, the frame rate converter 350 can also directly output the frame rate without any additional frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner module 110 to control the tuning of an RF broadcast corresponding to a channel selected by a user or a previously stored channel.

In addition, the processor 330 may control the image display apparatus 100 according to a user command input through the user input device 150 or an internal program.

In addition, the processor 330 may transmit data to the network interface 135 or to the external device interface 130.

In addition, the processor 330 may control the demultiplexer 310, the video processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the video processor 320.

Figure 4A:
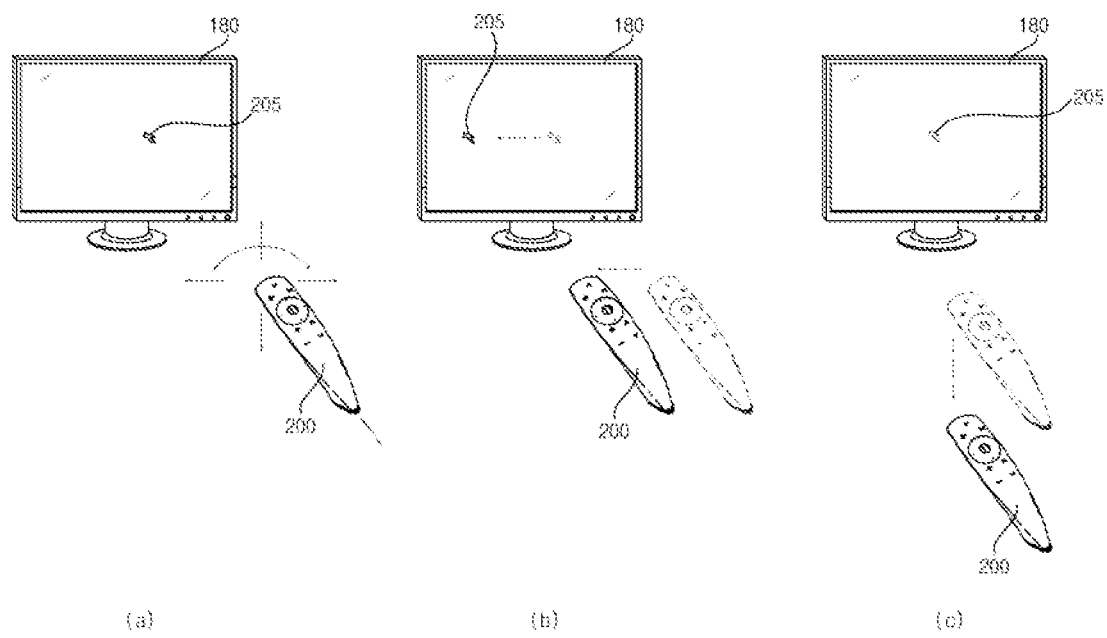
FIG. 4A is a diagram showing a control method of a remote controller of FIG. 2.

FIG. 4A is a diagram illustrating a control method of the remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be decreased. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
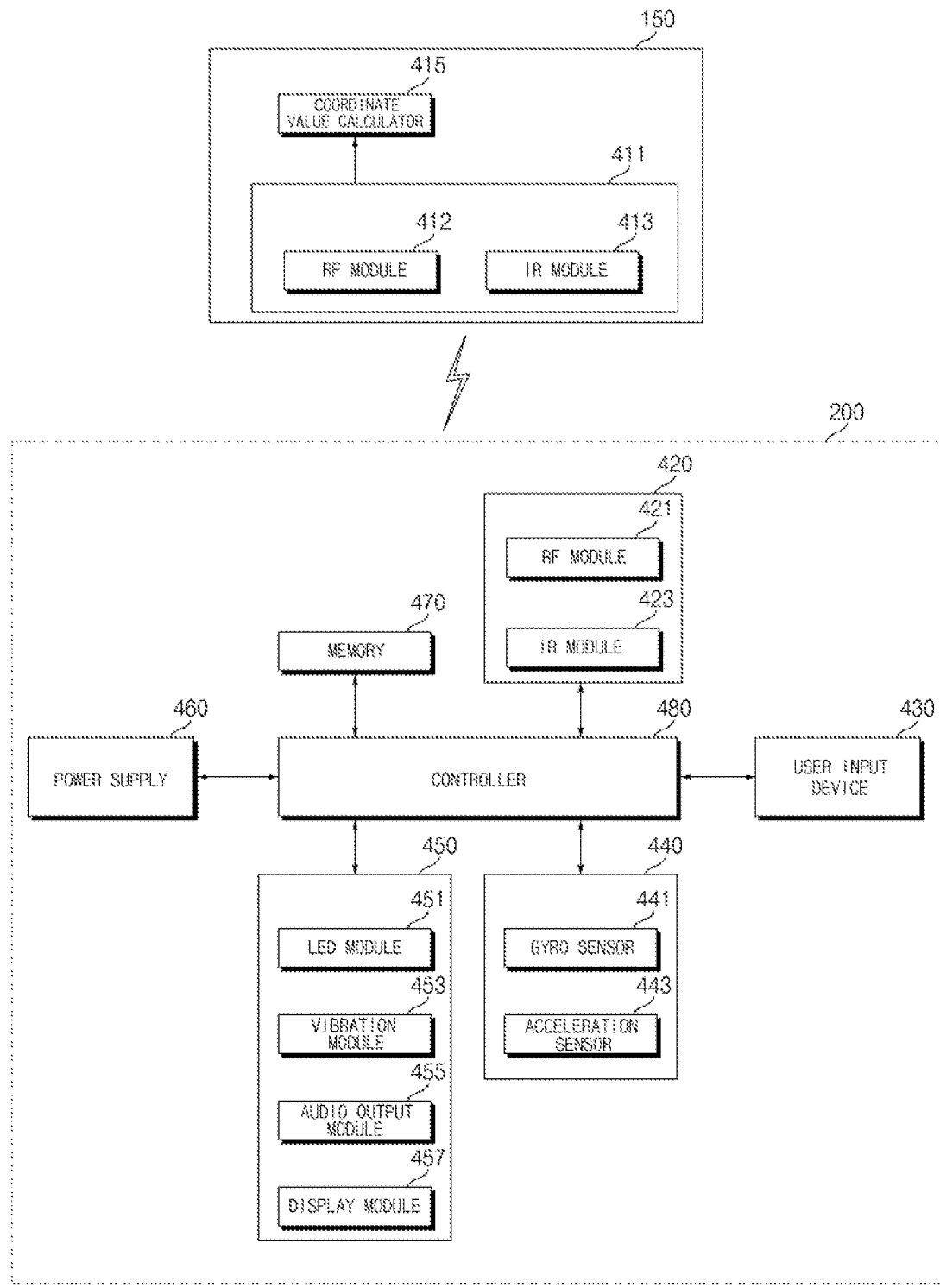
FIG. 4B is an internal block diagram of the remote controller of FIG. 2.

FIG. 4B is an internal block diagram of the remote controller of FIG. 2.

Referring to the figure, the remote controller 200 includes a wireless communicator 425, a user input device 435, a sensor unit 440, an output unit 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means such as a scroll key, a jog key, etc., which can be operated by the user, and the present disclosure does not limit the scope of the present disclosure.

The sensor unit 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input device 435 or a signal transmitted from the image display apparatus 100. Through the output unit 450, the user may recognize whether the user input device 435 is operated or whether the image display apparatus 100 is controlled.

For example, the output unit 450 may include an LED module 451 that is turned on when the user input device 435 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor unit 440 to the image display apparatus 100 through the wireless communicator 425.

The user input device 150 of the image display apparatus 100 includes a wireless communicator 151 that can wirelessly transmit and receive a signal to and from the remote controller 200 and a coordinate value calculator 415 that can calculate the coordinate value of a pointer corresponding to the operation of the remote controller 200.

The user input device 150 may wirelessly transmit and receive a signal to and from the remote controller 200 through the RF module 412. In addition, the user input device 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communicator 151 and calculate the coordinate value (x, y) of the pointer 205 to be displayed on the display 180.

The transmission signal of the remote controller 200 inputted to the image display apparatus 100 through the user input device 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input device 150 of the image display apparatus 100. In this case, the user input device 150 of the image display apparatus 100 may transmit information on the received pointer coordinate value to the controller 180 without a separate correction process of hand shake or error.

For another example, unlike the drawing, the coordinate value calculator 415 may be provided in the signal processor 170, not in the user input device 150.

Figure 5:
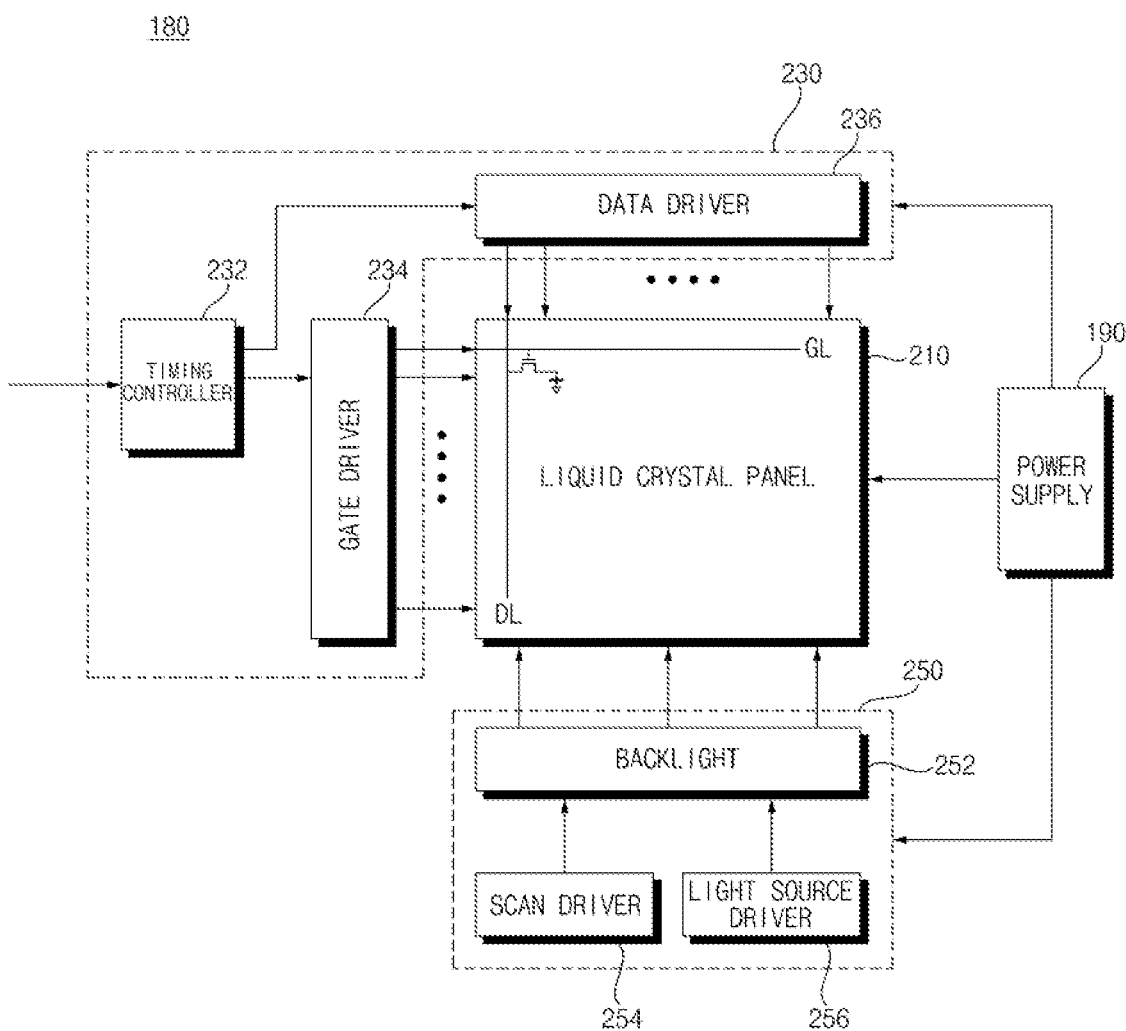
FIG. 5 is an example of an internal block diagram of a display of FIG. 2.

FIG. 5 is an example of an internal block diagram of the display of FIG. 2.

Referring to the figure, a liquid crystal display panel (LCD panel)-based display 180 may include a liquid crystal panel 210, a driving circuit 230, and a backlight device 250.

The liquid crystal panel 210 includes a first substrate in which a plurality of gate lines GL and a plurality of data lines DL are disposed so as to intersect each other in a matrix form and a thin film transistor and a pixel electrode connected thereto are formed at each intersection, a second substrate having a common electrode, and a liquid crystal layer formed between the first substrate and the second substrate.

The driving circuit 230 drives the liquid crystal panel 210 based on a control signal and a data signal supplied from a second controller 175 of FIG. 2. To this end, the driving circuit 230 includes a timing controller 232, a gate driver 234, and a data driver 236.

Upon receiving a control signal, RGB data signals, and a vertical synchronization signal Vsync from the second controller 175, the timing controller 232 controls the gate driver 234 and the data driver 236 in response to the control signal, relocates the RGB data signals, and provides the relocated RGB data signals to the data driver 236.

Under control of and the timing controller 232, the gate driver 234 and the data driver 236 supply a scanning signal and an image signal to the liquid crystal panel 210 via the gate lines GL and the data line DL.

The backlight device 250 supplies light to the liquid crystal panel 210. To this end, the backlight device 250 may include a backlight 252 including a plurality of light sources, a scan driver 254 configured to control scanning driving of the backlight 252, and a light source driver 256 configured to turn the backlight 252 on/off.

A predetermined image is displayed using light emitted from the backlight device 250 in the state in which light transmittance of the liquid crystal layer is adjusted due to an electric field formed between the pixel electrodes of the liquid crystal panel 210 and the common electrode.

The power supply 190 may supply common electrode voltage Vcom to the liquid crystal panel 210 and may supply gamma voltage to the data driver 236. In addition, the power supply 190 may supply driving voltage for driving the backlight 252 to the backlight device 250.

Figure 6A:
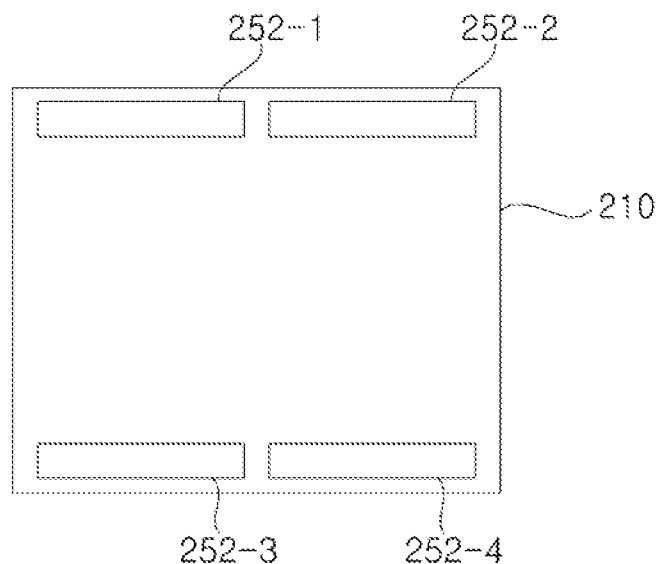
FIGS. 6A to 6C are diagrams illustrating various examples of the arrangement of a backlight of FIG. 5.
Figure 6B:
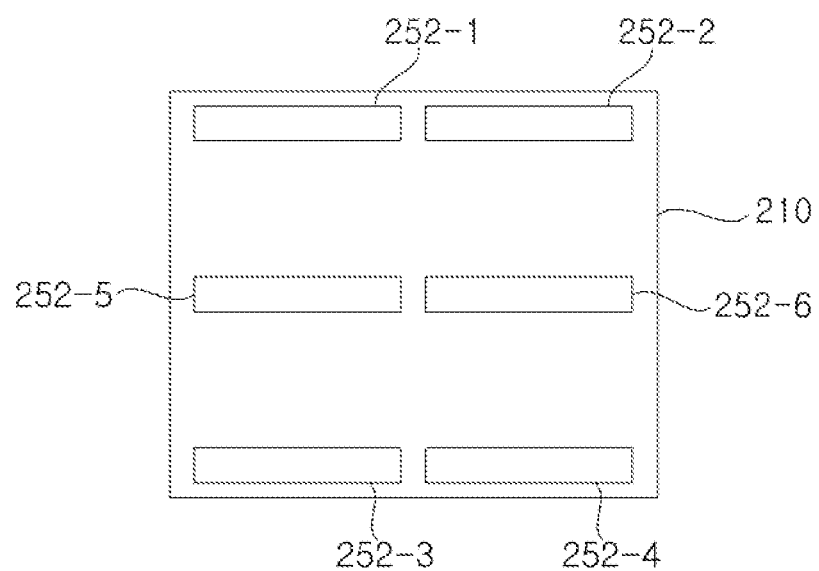
Figure 6C:
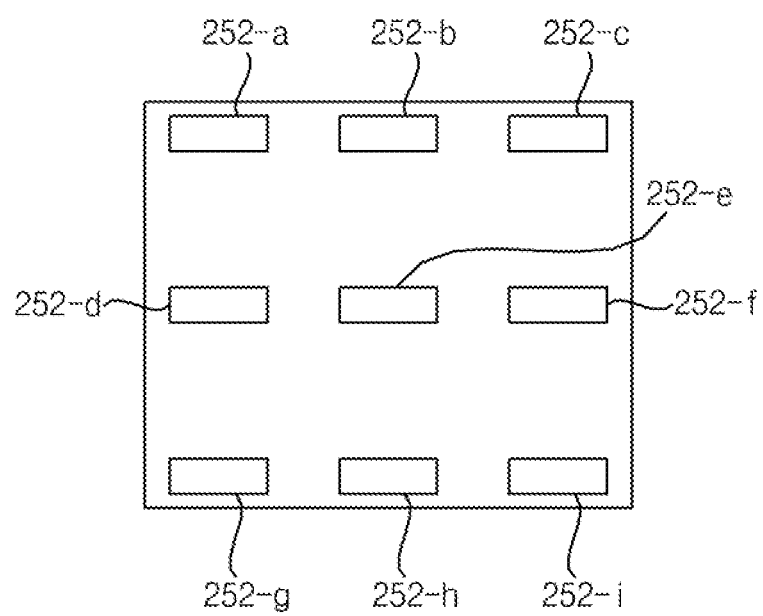

FIGS. 6A to 6C are diagrams illustrating various examples of the arrangement of the backlight of FIG. 5.

First, FIG. 6A illustrates a plurality of light sources 252-1, 252-2, 252-3, and 252-4 disposed at the upper side and the lower side of the rear surface of the liquid crystal panel 210. Each of the plurality of light sources 252-1, 252-2, 252-3, and 252-4 may include a plurality of light emitting diodes (LEDs).

Next, FIG. 6B illustrates a plurality of light sources 252-1, 252-2, 252-3, 252-4, 252-5, and 252-6 disposed at the upper side, the lower side, and the middle of the rear surface of the liquid crystal panel 210. Each of the plurality of light sources 252-1, 252-2, 252-3, 252-4, 252-5, and 252-6 may include a plurality of light emitting diodes (LEDs).

Next, FIG. 6C illustrates a plurality of light sources 252-a, 252-b, and 252-c disposed at the upper side, a plurality of light sources 252-g, 252-h, and 252-i disposed at the lower side, and a plurality of light sources 252-d, 252-e, and 252-f disposed at the middle of the rear surface of the liquid crystal panel 210. Each light source may include a plurality of light emitting diodes (LEDs).

Figure 7:
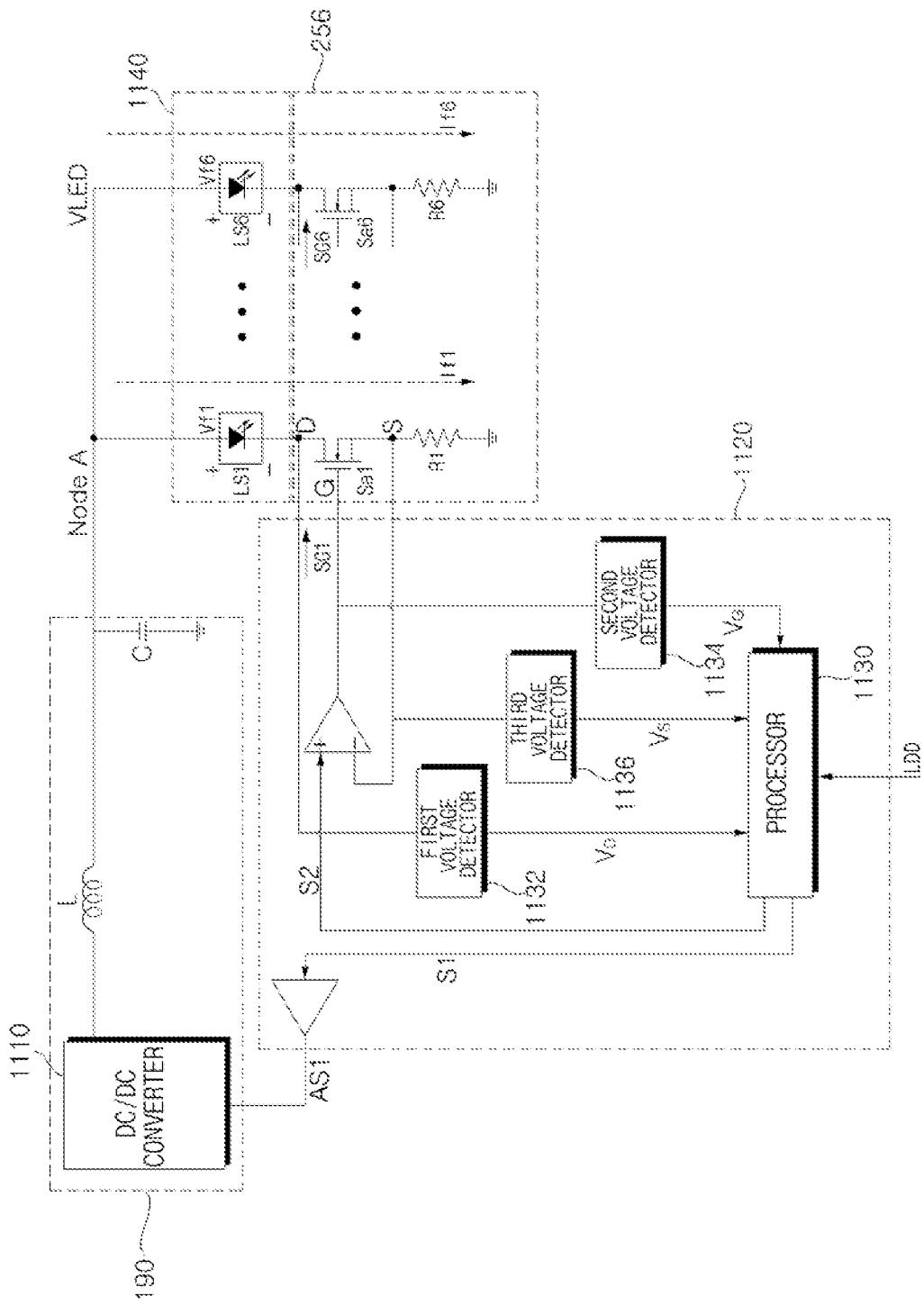
FIG. 7 is an example of a circuit diagram of a backlight device of FIG. 5.

FIG. 7 is an example of a circuit diagram of the backlight device of FIG. 5.

Referring to the figure, the backlight device 250 may include a plurality of light sources LS1 to LS6 (1140) connected to each other in parallel, a light source driver 256 configured to drive the plurality of plurality of light sources LS1 to LS6 (1140), and a processor 1120 configured to control the light source driver 256.

Meanwhile, the backlight device 250 may further include a power supply 190 configured to supply common power VLED to the plurality of light sources LS1 to LS6 (1140).

Here, each of the light sources LS1 to LS6 may include a plurality of LEDs connected to each other in series, in parallel, or in series and parallel.

As described above, as the resolution of the image display apparatus 100 increases to high definition (HD), full HD, ultra-high definition (UHD), 4K, and 8K, the number of LEDs may be increased.

Meanwhile, in the case in which a high-resolution panel 210 is used, control may be performed such that current If having a changed level flows to each of the light source strings 252-1 to 252-5, among the plurality of light sources 252, based on local dimming data in order to improve contrast or definition.

According to this, current If having a changed level flows in proportion to the local dimming data, whereby light having different luminance is output for each of the light source strings 252-1 to 252-5 based on the local dimming data.

Consequently, luminance in a bright portion is brighter and luminance in a dark portion is darker due to current If having an increased level. As a result, contrast or definition may be improved at the time of displaying an image.

The power supply 190 outputs a common voltage VLED to the plurality of light sources. To this end, the power supply 190 may include a DC/DC converter 1110 configured to convert the level of DC voltage and to output DC power having the converted level, an inductor L configured to remove harmonics, etc., and a capacitor C configured to store the DC voltage.

Voltage at the opposite ends of the capacitor C corresponds to voltage supplied between node A and a ground terminal, which may correspond to voltage applied to the plurality of light sources LS1 to LS6 (1140), a plurality of switching devices Sa1 to Sa6, and resistors R1 to R6. That is, voltage at node A is common voltage that is supplied to the plurality of light sources LS1 to LS6, and may be referred to as voltage VLED, as shown in the figure.

Voltage VLED is equal to the sum of driving voltage Vf1 of the first light source string LS1, voltage at opposite ends of the first switching device Sa1, and voltage consumed by the first resistor R1.

Alternatively, voltage VLED is equal to the sum of driving voltage Vf1 of the second light source string LS2, voltage at opposite ends of the second switching device Sa2, and voltage consumed by the second resistor R2. Alternatively, voltage VLED is equal to the sum of driving voltage Vf1 of the sixth light source string LS6, voltage at opposite ends of the sixth switching device Sa6, and voltage consumed by the n-th resistor Rn.

Meanwhile, as the resolution of the panel 210 increases, backlight driving voltages Vf1 to Vf6 increase, whereby driving currents If1 to If6 that flow in the backlight increase. Consequently, power consumed by the plurality of switching devices Sa1 to Sa6 and the resistors R1 to R6 increases, whereby stress of the plurality of switching devices Sa1 to Sa6 and the resistors R1 to R6 also increases.

In order to reduce power consumption at the time of driving the backlight, the driving currents If1 to If6 that flow in the plurality of switching devices Sa1 to Sa6 and the resistors R1 to R6 may be decreased. At this time, it is assumed that the backlight driving voltages Vf1 to Vf6 are uniform.

To this end, the driving controller 1120 includes a first voltage detector 1132 configured to detect voltage VD of a drain terminal D of each of the plurality of switching devices Sa1 to Sa6, each of which is implemented with an FET. The driving controller 1120 may further include a second voltage detector 1134 configured to detect voltage VG of each gate terminal G and a third voltage detector 1136 configured to detect voltage VS of each source terminal S.

The driving controller 1120 may compare the drain terminal voltages VD detected at the drain terminals D of the plurality of switching devices Sa1 to Sa6, may generate a target driving current flowing in the plurality of light sources 1140 based on the lowest drain terminal voltage, and may output a switching control signal SG corresponding to the generated target driving current.

The switching control signal SG is input to a comparator, and, when greater than the voltage VD of a detected source terminal, is output from the comparator and is input to the gate terminal G. As a result, the switching device is driven based on the switching control signal SG.

Meanwhile, in order to generate such a switching control signal, the driving controller 1120 may include a processor 1130 configured to generate a switching control signal for driving the gate electrode of each of the plurality of switching devices Sa1 to Sa6 based on the drain terminal voltage of each of the plurality of switching devices Sa1 to Sa6.

Meanwhile, the processor 1130 may control the light source driver 256. Specifically, the processor 1130 may change the turn on duty of each of the plurality of switching devices Sa1 to Sa6 or the level of current flowing in each of the plurality of switching devices Sa1 to Sa6.

In particular, the processor 1130 may adjust the turn on duty of each of the plurality of light sources LS1 to LS6 or the level of current flowing in each of the plurality of light sources LS1 to LS6 is changed.

For example, the processor 1130 may change the level of the switching control signal SG based on the magnitude of the drain terminal voltage VD of each of the plurality of switching devices Sa1 to Sa6.

Meanwhile, the processor 1130 may change the level of the switching control signal SG or the duty of the switching control signal SG based on the magnitude of the drain terminal voltage VD of each of the plurality of switching devices Sa1 to Sa6.

Meanwhile, the processor 1130 may control current If having a changed level to sequentially flow to each of the plurality of light sources 252-1 to 252-6, among the plurality of light sources 252, based on local dimming data.

Meanwhile, the processor 1130 may perform increase the level of current If flowing to each of the light sources 252-1 to 252-6, as the level of local dimming data increases, and decrease the level of current If flowing to each of the light sources 252-1 to 252-6, as the level of local dimming data decreases.

Meanwhile, the processor 1130 may control the level of common voltage output from the power supply to be uniform for each frame.

Figure 8:
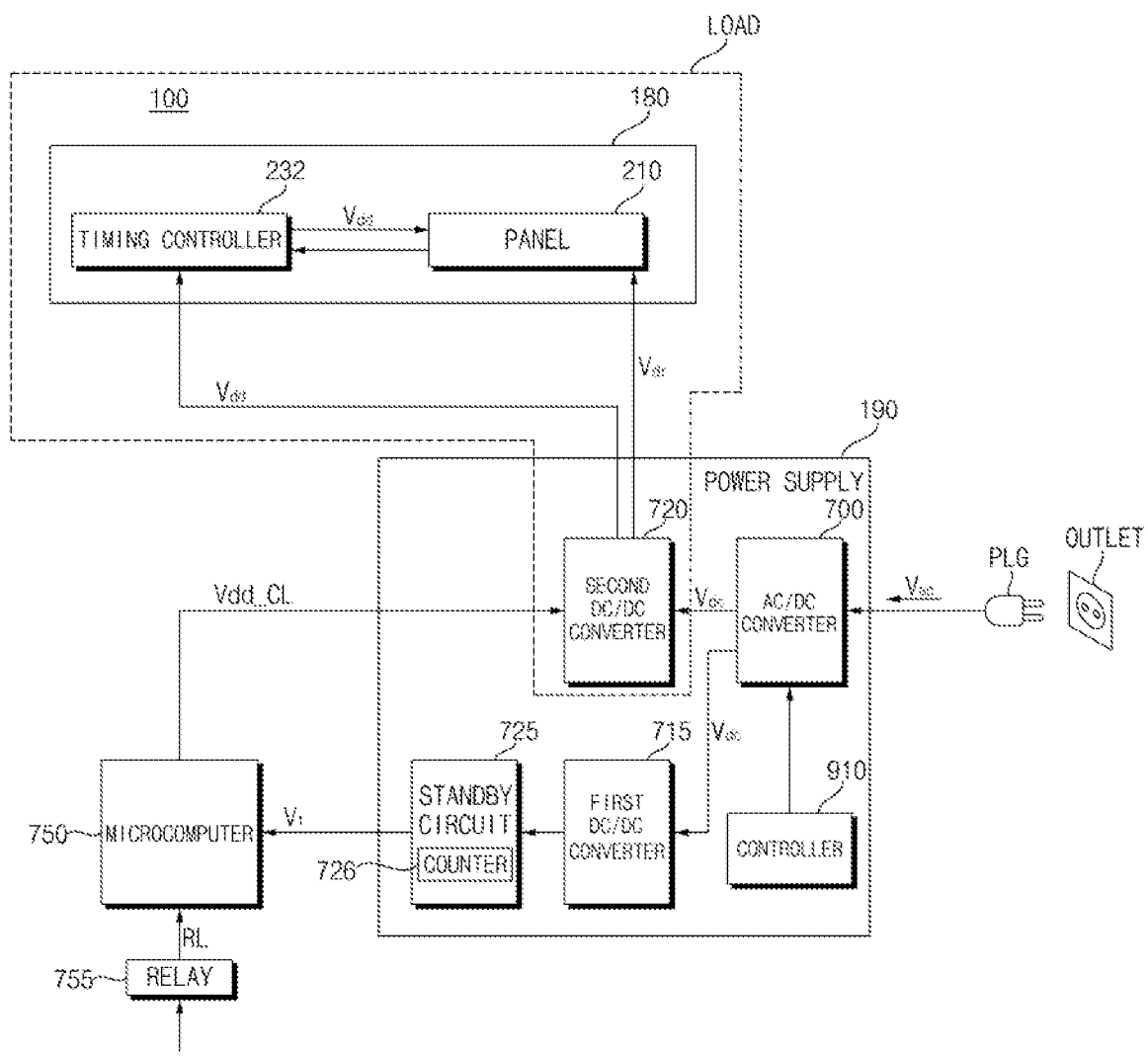
FIG. 8 is an example of an internal circuit diagram of a power supply according to an embodiment of the present disclosure.

FIG. 8 is an example of an internal circuit diagram of a power supply according to an embodiment of the present disclosure.

Referring to FIG. 8, the image display apparatus 100 of FIG. 8 may include a power supply 190, a microcomputer 750, a relay 755, a timing controller 232, and a panel 210.

When a plug PLG is connected to an outlet OUTLET, AC voltage Vac is supplied to the power supply 190. When the plug PLG is disconnected from the outlet OUTLET, no AC voltage is supplied to the power supply 190.

The power supply 190 may include an AC/DC converter 700 configured to convert AC voltage Vac into DC voltage, a first DC/DC converter 715 configured to convert the level of the DC voltage, a second DC/DC converter 720 configured to convert the level of the DC voltage, a standby circuit 725 configured to supply standby power at the time of power off, and a controller 910.

Meanwhile, when a power on signal from the remote controller 200 is received, the relay 755 may be operated, and an operation signal RL may be input to the microcomputer 750.

The microcomputer 750 may be operated by operation power V1 from the power supply 190, and may output a power control signal Vdd_CL to the power supply 190.

The power supply 190 may output operation power Vdd to the timing controller 232 in response to the power control signal Vdd_CL, and may output driving voltage Vdr to the panel 210. The timing controller 232 may output the operation power Vdd to the panel 210.

Meanwhile, the second DC/DC converter 720 and the display 180 may be connected to the output ends of the AC/DC converter 700. Consequently, the second DC/DC converter 720 and the display 180 may be called a load of the converter 700.

Meanwhile, the AC/DC converter 700 may include a switching device in order to efficiently supply high power according to a trend of increasing resolution of the display 180.

To this end, the controller 910 may control switching of the switching device in the AC/DC converter 700. The operation of the converter 700 and the controller 910 will be described with reference to FIG. 9 and subsequent figures.

Figure 9:
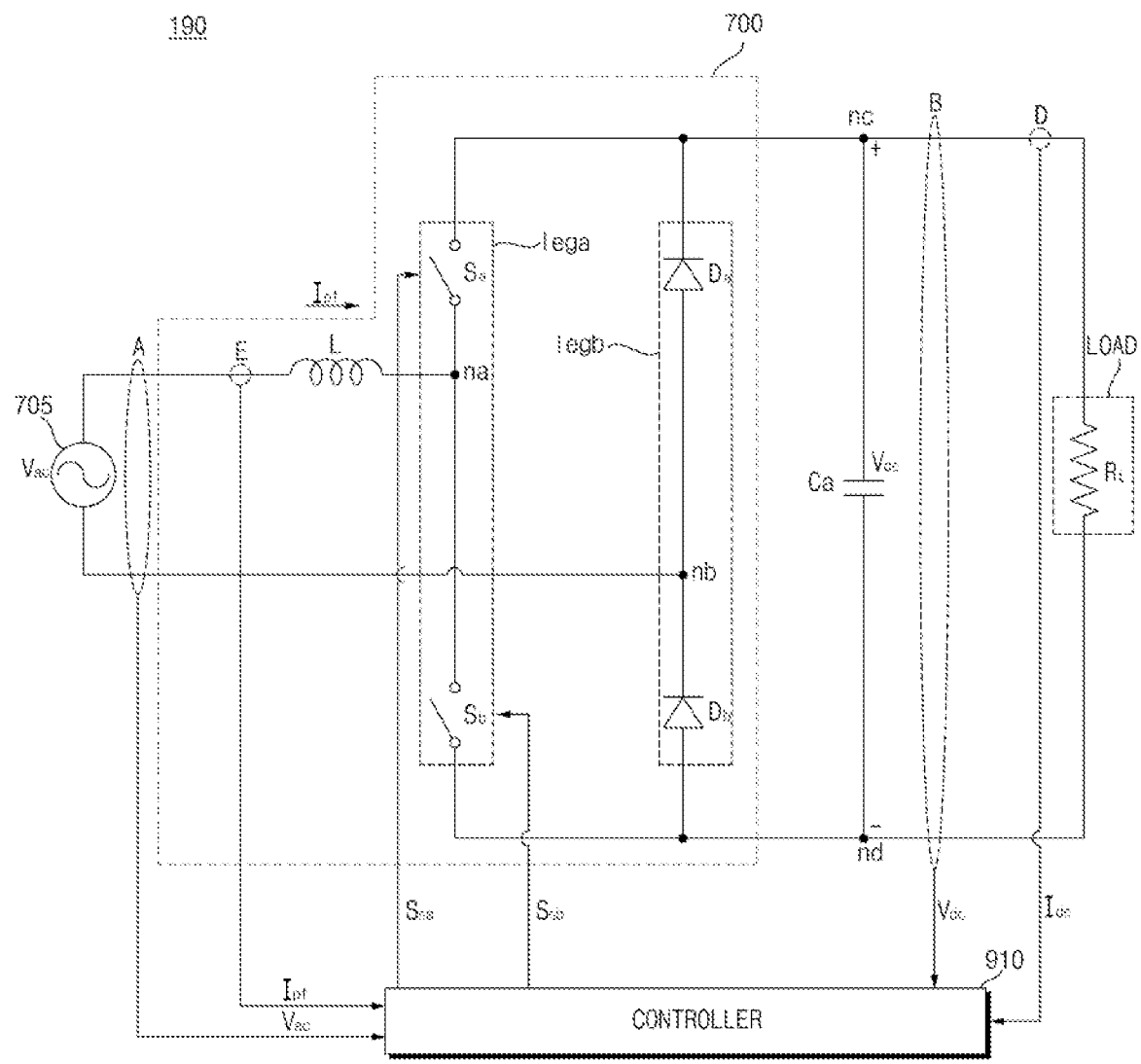
FIG. 9 is an example of an internal circuit diagram of a converter of FIG. 8.

FIG. 9 is an example of an internal circuit diagram of the converter of FIG. 8.

Referring to the figure, the power supply 190 according to the embodiment of the present disclosure may include a converter 700 configured to convert input AC voltage Vac (705) into DC voltage Vdc and to output the DC voltage Vdc and a controller 910 configured to control the converter 700.

The power supply 190 according to the embodiment of the present disclosure may further include an input voltage detector A configured to detect input AC voltage Vac input to the converter 700, an input current detector E configured to detect input current flowing in the converter 700, a capacitor Ca connected to the output ends nc-nd of the converter 700, an output voltage detector B configured to detect voltage of the output ends nc-nd of the converter 700, and an output current detector D configured to detect current flowing in the output ends of the converter 700.

The input voltage detector A may detect input AC voltage Vac input to the converter 700. To this end, the input voltage detector A may include a resistor and an amplifier. The detected input voltage Vac may be input to the controller 910 as a pulse type discrete signal.

The input current detector E may detect current Ipf flowing in the converter 700. To this end, a current transformer (CT) or a shunt resistor may be used as the input current detector E. The detected current Ipf may be input to the controller 910 as a pulse type discrete signal.

The output voltage detector B may detect output voltage Vdc of the output ends of the converter 700, i.e. both ends nc-nd of the capacitor Ca. To this end, the output voltage detector B may include a resistor and an amplifier. The detected output voltage Vdc may be input to the controller 910 as a pulse type discrete signal.

Meanwhile, both ends nc-nd of the capacitor Ca, which are the output ends of the converter 700, may be referred to as dc ends.

The output current detector D may detect output current Idc flowing in the output ends of the converter 700. To this end, a current transformer (CT) or a shunt resistor may be used as the output current detector D. The detected output current Idc may be input to the controller 910 as a pulse type discrete signal.

Meanwhile, the converter 700 may include a plurality of switching devices Sa and Sb and a plurality of diodes Da and Db in order to efficiently supply high power, and may convert the level of input voltage Vac based on switching operation of the switching devices Sa and Sb, and may output DC voltage Vdc.

Specifically, the converter 700 may include a first leg lega including a first switching device Sa and a second switching device Sb connected to each other in series, and a second leg legb including a first diode Da and a second diode Db connected to the first leg lega in parallel while being connected to each other in series.

One end of the first switching device Sa may be connected to one nc of the output ends nc-nd of the converter 700, and the other end of the first switching device Sa may be connected to a first node na.

One end of the second switching device Sb may be connected to the first node na, and the other end of the second switching device Sb may be connected to the other nd of the output ends nc-nd of the converter 700.

One end (cathode) of the first diode Da may be connected to one nc of the output ends nc-nd of the converter 700, and the other end (anode) of the first diode Da may be connected to a second node nb.

One end (cathode) of the second diode Db may be connected to the second node nb, and the other end (anode) of the second diode Db may be connected to the other nd of the output ends nc-nd of the converter 700.

Meanwhile, the converter 700 of FIG. 9 may be referred to as a totem pole type converter.

On the other hand, since the converter 700 of FIG. 9 includes two half bridge type switching devices and two half bridge type diodes, the converter 700 of FIG. 9 may be referred to as a half bridge converter.

Meanwhile, the converter 700 may further include an inductor L disposed between the first node na, which is located between the first switching device Sa and the second switching device Sb, and an input end to which input AC voltage Vac is input.

Meanwhile, the input current detector E may detect current flowing in the inductor L of the converter 700.

Meanwhile, a load LOAD connected to the capacitor in parallel may be connected to the output ends nc-nd of the converter 700.

In the figure, a resistor RL is illustrated as an equivalent device for the load LOAD. In addition, a capacitor or an inductor may be used.

Meanwhile, as described above, the load LOAD may include the second DC/DC converter 720 of FIG. 8 and the display 180.

Figure 10:
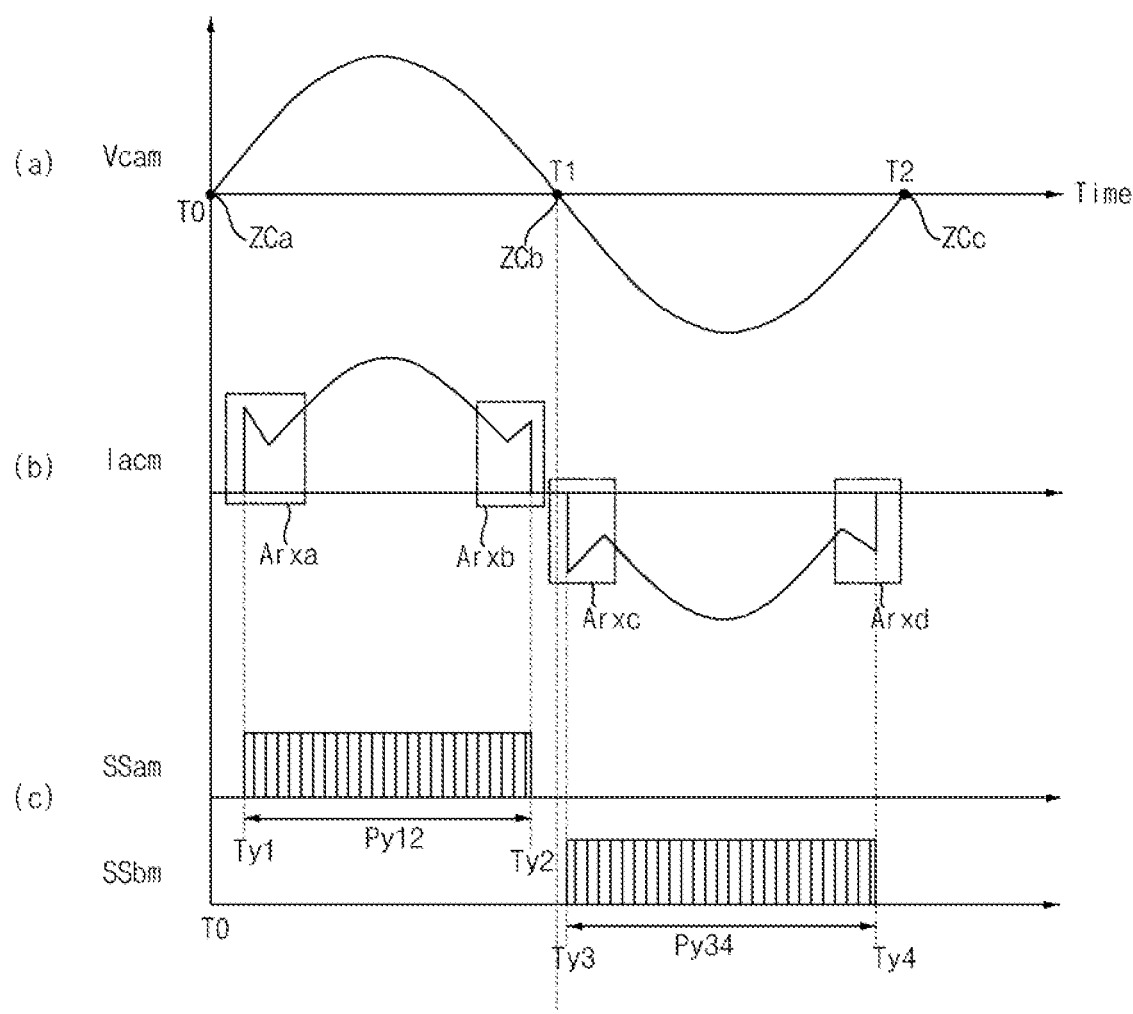
FIG. 10 is a waveform diagram of input voltage, input current, and a switching control signal of the converter related to the present disclosure.

FIG. 10 is a waveform diagram of input voltage, input current, and a switching control signal of the converter related to the present disclosure.

Referring to the figure, in the state in which input AC voltage Vacm having zero crossing points ZCa, ZCb, and ZCc is input to the converter 700 of FIG. 9 at points in time T0, T1, and T2, respectively, the first switching device Sa may repeatedly turn on and off for a period Py12 from a point in time Ty1 to a point in time Ty2 according to a first switching control signal SSam, which is a pulse width modulation signal, and the second switching device Sb may repeatedly turn on and off for a period Py34 from a point in time Ty3 to a point in time Ty4 according to a second switching control signal SSbm, which is a pulse width modulation signal.

Meanwhile, the first switching device Sa is in an off state between the point in time T0 and the point in time Ty1, and when the first switching device Sa turns on at the point in time Ty1, instantaneously abrupt current or inrush current flows, and instantaneous peak current is generated in an area Arxa of input current iacm.

As a result, noise is generated due to the instantaneous peak current in the area Arxa of the input current iacm.

Similarly, the first switching device Sa repeatedly turns on and off between the point in time Ty1 and the point in time Ty2, and when the first switching device Sa remains off from the point in time Ty2, instantaneously abrupt current or inrush current flows, and instantaneous peak current is generated in an area Arxb of the input current iacm.

As a result, noise is generated due to the instantaneous peak current in the area Arxb of the input current iacm.

Meanwhile, the second switching device Sb is in an off state between the point in time Ty2 and the point in time Ty3, and when the second switching device Sb turns on at the point in time Ty3, instantaneously abrupt current or inrush current flows, and instantaneous peak current is generated in an area Arxc of the input current iacm.

As a result, noise is generated due to the instantaneous peak current in the area Arxc of the input current iacm.

Similarly, the second switching device Sb repeatedly turns on and off between the point in time Ty3 and the point in time Ty4, and when the second switching device Sb remains off from the point in time Ty4, instantaneously abrupt current or inrush current flows, and instantaneous peak current is generated in an area Arxd of the input current iacm.

As a result, noise is generated due to the instantaneous peak current in the area Arxd of the input current iacm.

Consequently, the present disclosure suggests a plan for reducing noise generated in the plurality of areas Arxa, Arxb, Arxc, and Arxd of the input current iacm.

A description thereof will be given with reference to FIG. 11A and subsequent figures.

Figure 11A:
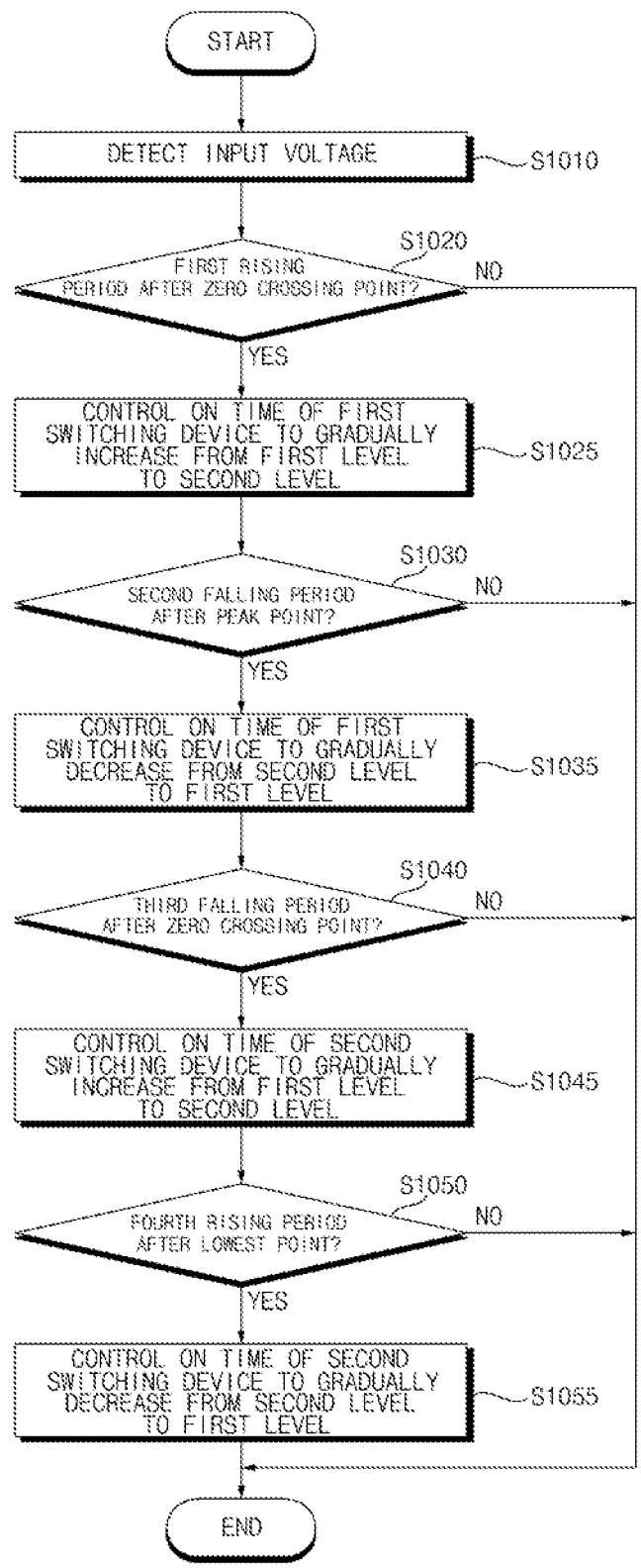
FIG. 11A is a flowchart showing an operation method of an image display apparatus according to an embodiment of the present disclosure.

FIG. 11A is a flowchart showing an operation method of an image display apparatus according to an embodiment of the present disclosure.

Referring to the figure, the input voltage detector A in the power supply 190 detects input AC voltage Vacn input to the converter 700 (S1010).

The input voltage detector A in the power supply 190 continuously detects input AC voltage Vacn, and transmits a detected discrete signal to the controller 910.

The controller 910 determines whether the input AC voltage Vacn corresponds to a first rising period P1 after a zero crossing point ZCa (S1020).

Figure 12:
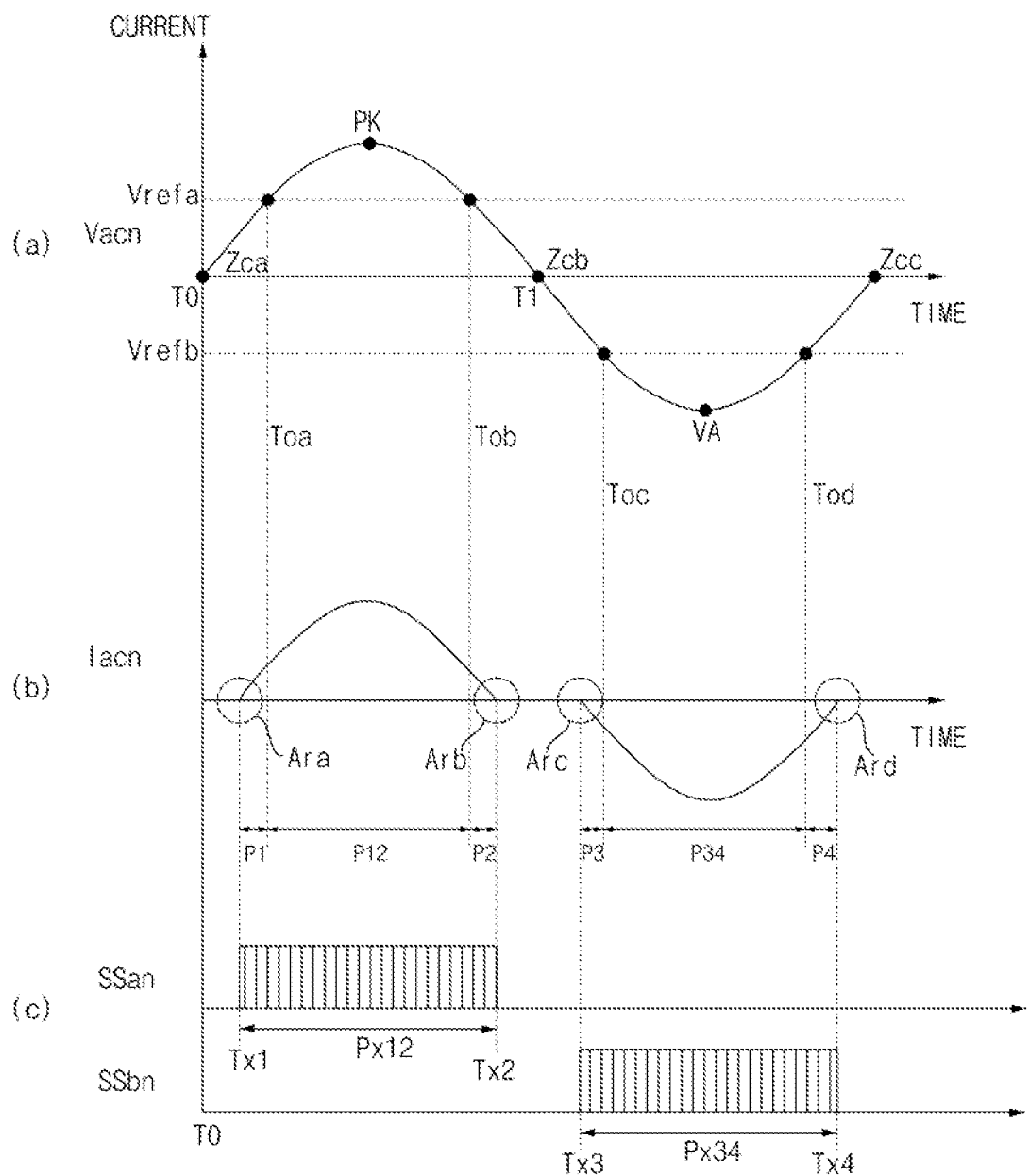
FIGS. 12 to 16B are diagrams referred to in the description of operation of the converter of FIG. 9.

For example, the controller 910 determines whether the input AC voltage Vacn detected by the input voltage detector A is between a zero crossing point ZCa and a first reference value vrefa of FIG. 12.

In case in which the input AC voltage Vacn corresponds to the first rising period P1 after the zero crossing point ZCa, the controller 910 controls on time of the first switching device Sa to gradually increase from a first level to a second level (S1025).

Figure 13A:
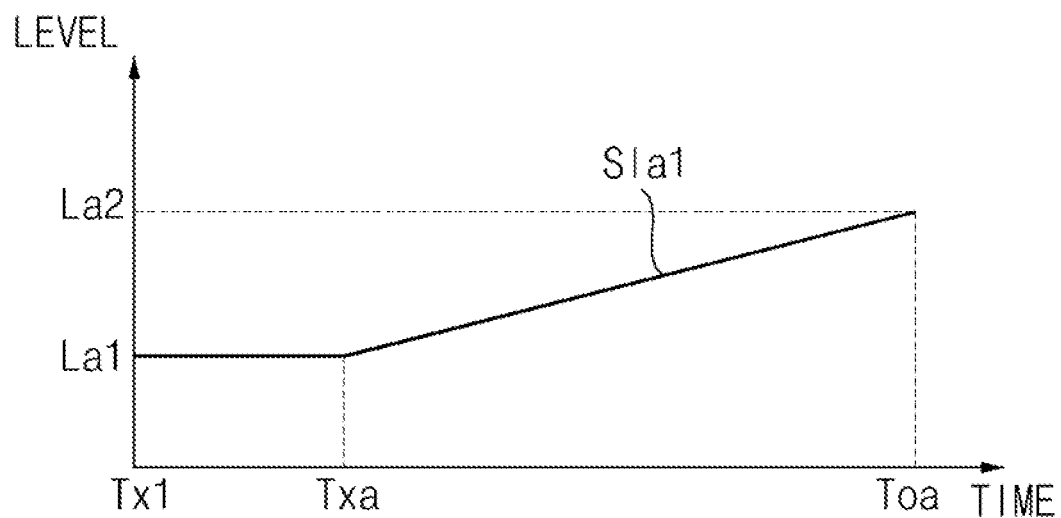
Figure 13B:
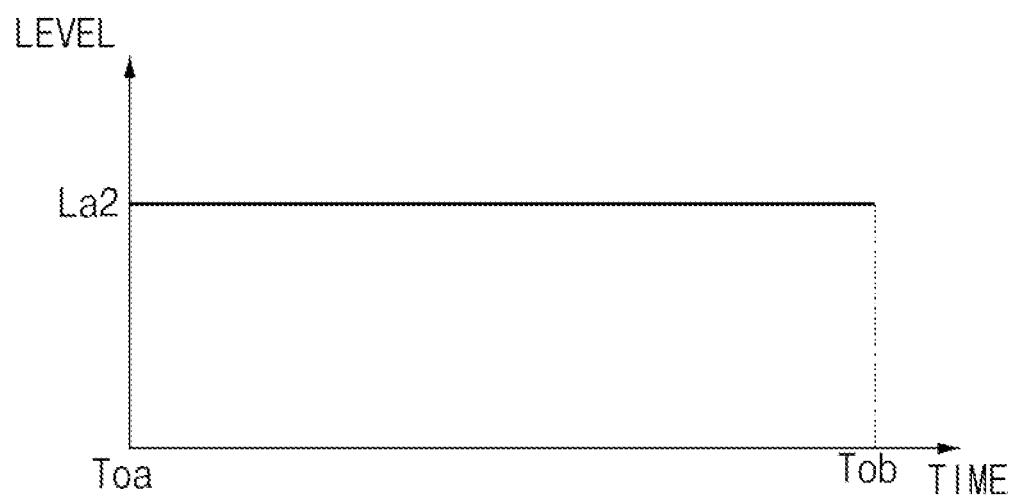
Figure 13C:
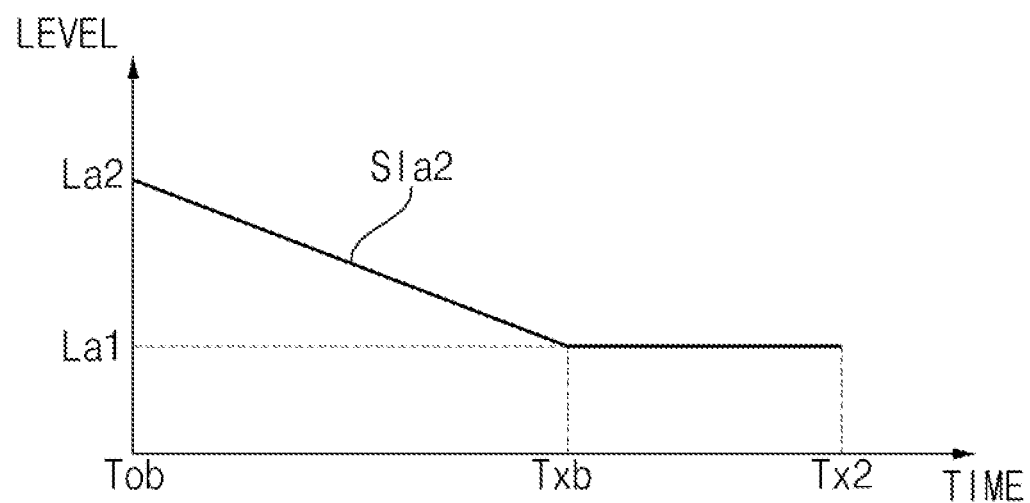

For example, in case in which the input AC voltage Vacn corresponds to the first rising period P1 after the zero crossing point ZCa, the controller 910 may control on time of the first switching device Sa to be maintained at a first level, which is the minimum on time, for a predetermined period and then gradually increase from the first level to a second level, as shown in FIG. 13C. As a result, peak current, e.g. Arxa of FIG. 10, is not generated, whereby it is possible to reduce noise at the time of supplying power according to the operation of the first switching device Sa.

Meanwhile, the minimum on time may be timing corresponding to the minimum duty among turn on duties of a first switching control signal SSan applied to the first switching device Sa.

Meanwhile, upon determining in step 1020 (S1020) that the input AC voltage Vacn does not correspond to the first period P1, the controller 910 determines whether the input AC voltage Vacn corresponds to a second falling period P2 after a peak point PK (S1030).

For example, the controller 910 determines whether the input AC voltage Vacn detected by the input voltage detector A is between the first reference value vrefa and a zero crossing point ZCb of FIG. 12.

In case in which the input AC voltage Vacn corresponds to the second falling period P2 after the first reference value vrefa, the controller 910 controls on time of the first switching device Sa to gradually decrease from the second level to the first level (S1035).

For example, in case in which the input AC voltage Vacn corresponds to the second falling period P2 after the first reference value vrefa, the controller 910 may control on time of the first switching device Sa to gradually decrease from the second level to the first level and is then maintained at the first level from a predetermined point in time, as shown in FIG. 13B. The first level at this time may correspond to the minimum on time. As a result, peak current, e.g. Arxb of FIG. 10, is not generated, whereby it is possible to reduce noise at the time of supplying power according to the operation of the first switching device Sa.

Meanwhile, upon determining in step 1030 (S1030) that the input AC voltage Vacn does not correspond to the second period P2, the controller 910 determines whether the input AC voltage Vacn corresponds to a third falling period P3 after the zero crossing point ZCb (S1040).

For example, the controller 910 determines whether the input AC voltage Vacn detected by the input voltage detector A is between the zero crossing point ZCb and a second first reference value vrefb of FIG. 12.

In case in which the input AC voltage Vacn corresponds to the third falling period P3 after the zero crossing point ZCb, the controller 910 controls on time of the second switching device Sb to gradually increase from a first level to a second level (S1045).

For example, in case in which the input AC voltage Vacn corresponds to the third falling period P3 after the zero crossing point ZCb, the controller 910 may control on time of the second switching device Sb to be maintained at a first level, which is the minimum on time, for a predetermined period and then to gradually increase from the first level to a second level, as shown in FIG. 13A.

As a result, peak current, e.g. Arxc of FIG. 10, is not generated, whereby it is possible to reduce noise at the time of supplying power according to the operation of the second switching device Sb.

Meanwhile, the minimum on time may be timing corresponding to the minimum duty among turn on duties of a second switching control signal SSbn applied to the second switching device Sb.

Meanwhile, upon determining in step 1040 (S1040) that the input AC voltage Vacn does not correspond to the third period P3, the controller 910 determines whether the input AC voltage Vacn corresponds to a fourth rising period P4 after the lowest point VA (S1050).

For example, the controller 910 determines whether the input AC voltage Vacn detected by the input voltage detector A is between a second reference value vrefb and the zero crossing point ZCb of FIG. 12.

In case in which the input AC voltage Vacn corresponds to the fourth rising period P4 after the lowest point VA, the controller 910 controls on time of the first seconding device Sb to gradually decrease from the second level to the first level (S1055).

For example, in case in which the input AC voltage Vacn corresponds to the fourth rising period P4 after the second reference value vrefb, the controller 910 may control on time of the second switching device Sb to gradually decrease from the second level to the first level and is then maintained at the first level from a predetermined point in time, as shown in FIG. 13C. The first level at this time may correspond to the minimum on time.

As a result, peak current, e.g. Arxd of FIG. 10, is not generated, whereby it is possible to reduce noise at the time of supplying power according to the operation of the second switching device Sb.

Meanwhile, the controller 910 may control to decrease on time of the first switching device Sa or decrease the second switching device Sb, as the peak level of the input AC voltage Vacn increases.

In particular, the controller 910 may control to decrease the minimum on time of the first switching device Sa or decrease the second switching device Sb, as the peak level of the input AC voltage Vacn increases. Consequently, it is possible to reduce noise due to an increase in the level of the input AC voltage Vacn.

Meanwhile, the controller 910 may control to decrease on time of the first switching device Sa or decrease the second switching device Sb, as the level of the output voltage Vdc decreases.

In particular, the controller 910 may control to decrease the minimum on time of the first switching device Sa or decrease the second switching device Sb, as the level of the output voltage Vdc decreases. Consequently, it is possible to reduce noise due to an increase in the level of the input AC voltage Vacn.

Meanwhile, in an image display apparatus according to another embodiment of the present disclosure, the controller 910 in the power supply 190 controls the maximum on time of the first switching device Sa to gradually increase for a first period P1 for which positive-polarity input AC voltage Vacn rises, and controls the maximum on time of the first switching device Sa to gradually decrease based on the input AC voltage Vacn for a second period P2 for which the positive-polarity input AC voltage Vacn falls. Consequently, it is possible to reduce noise due to the supply of power. In particular, it is possible to reduce noise at the time of switching the converter 700 configured to supply power to the display 180.

A description thereof will be given with reference to FIG. 11B and subsequent figures.

Figure 11B:
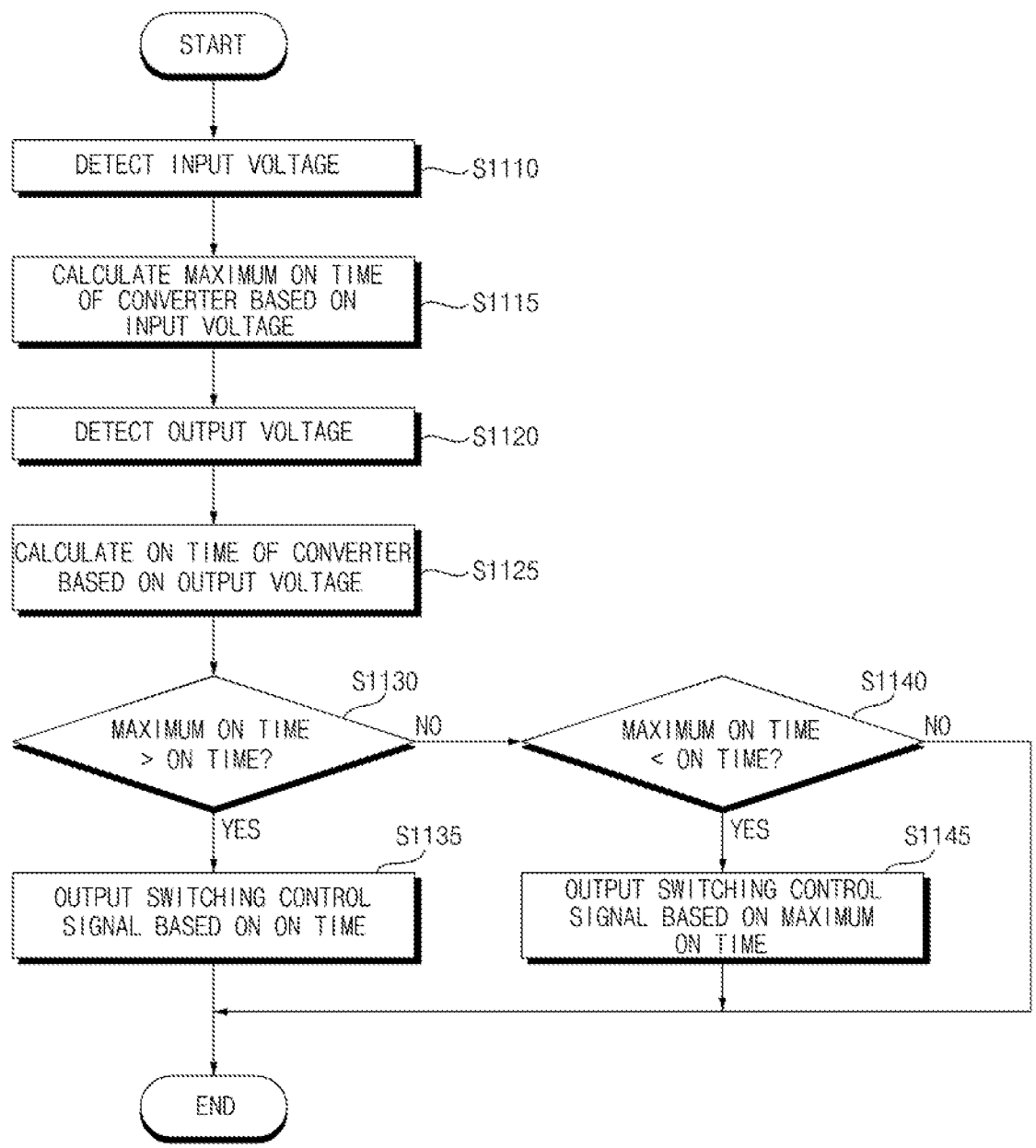
FIG. 11B is a flowchart showing an operation method of an image display apparatus according to another embodiment of the present disclosure.

FIG. 11B is a flowchart showing an operation method of an image display apparatus according to another embodiment of the present disclosure.

Referring to the figure, in the image display apparatus according to the other embodiment of the present disclosure, the input voltage detector A in the power supply 190 detects input AC voltage Vacn input to the converter 700 (S1110).

The input voltage detector A in the power supply 190 continuously detects input AC voltage Vacn, and transmits a detected discrete signal to the controller 910.

The controller 910 calculates the maximum on time based on the input AC voltage Vacn (S1115).

For example, the controller 910 may calculate the maximum on time corresponding to the maximum duty of the first switching device Sa or the second switching device Sb based on the input AC voltage Vacn.

Subsequently, the output voltage detector B in the power supply 190 calculates output voltage Vdc of the output ends of the converter 700 (S1120).

The output voltage detector B in the power supply 190 continuously detects output voltage Vdc, and transmits a detected discrete signal to the controller 910.

The controller 910 calculates on time of the converter 700 based on the output voltage Vdc (S1125).

For example, the controller 910 may calculate on time corresponding to the duty of the first switching device Sa or the second switching device Sb based on the output voltage Vdc.

Subsequently, the controller 910 determines whether the maximum on time is greater than the on time (S1130). In case in which the maximum on time is greater than the on time, the controller 910 outputs a switching control signal based on the on time (S1135).

For example, in case in which the calculated maximum on time is greater than the calculated on time, the controller 910 may generate and output a first switching control signal Ssan or a second switching control signal Ssbn based on the on time, which is a smaller value. Consequently, it is possible to reduce noise due to the supply of power. In particular, it is possible to reduce noise at the time of switching the converter 700 configured to supply power to the display 180.

Meanwhile, upon determining in step 1130 (S1130) that the maximum on time is not greater than the on time, the controller 910 determines whether the on time is greater than the maximum on time (1140). In case in which the on time is greater than the maximum on time, the controller 910 outputs a switching control signal based on the maximum on time (S1145).

For example, determining that the calculated on time is greater than the calculated maximum on time, the controller 910 may generate and output a first switching control signal Ssan or a second switching control signal Ssbn based on the maximum on time, which is a smaller value. Consequently, it is possible to reduce noise due to the supply of power. In particular, it is possible to reduce noise at the time of switching the converter 700 configured to supply power to the display 180.

Meanwhile, in an image display apparatus according to a further embodiment of the present disclosure, the controller 910 in the power supply 190 calculates the maximum on time of the first switching device Sa based on input AC voltage Vacn, calculates on time of the first switching device Sa based on output voltage of the output ends nc-nd of the converter 700, and outputs a first switching control signal for driving the first switching device Sa based on the maximum on time and the on time. Consequently, it is possible to reduce noise due to the supply of power. In particular, it is possible to reduce noise at the time of switching the converter 700 configured to supply power to the display 180. A description thereof will be given with reference to FIG. 11C and subsequent figures.

Figure 11C:
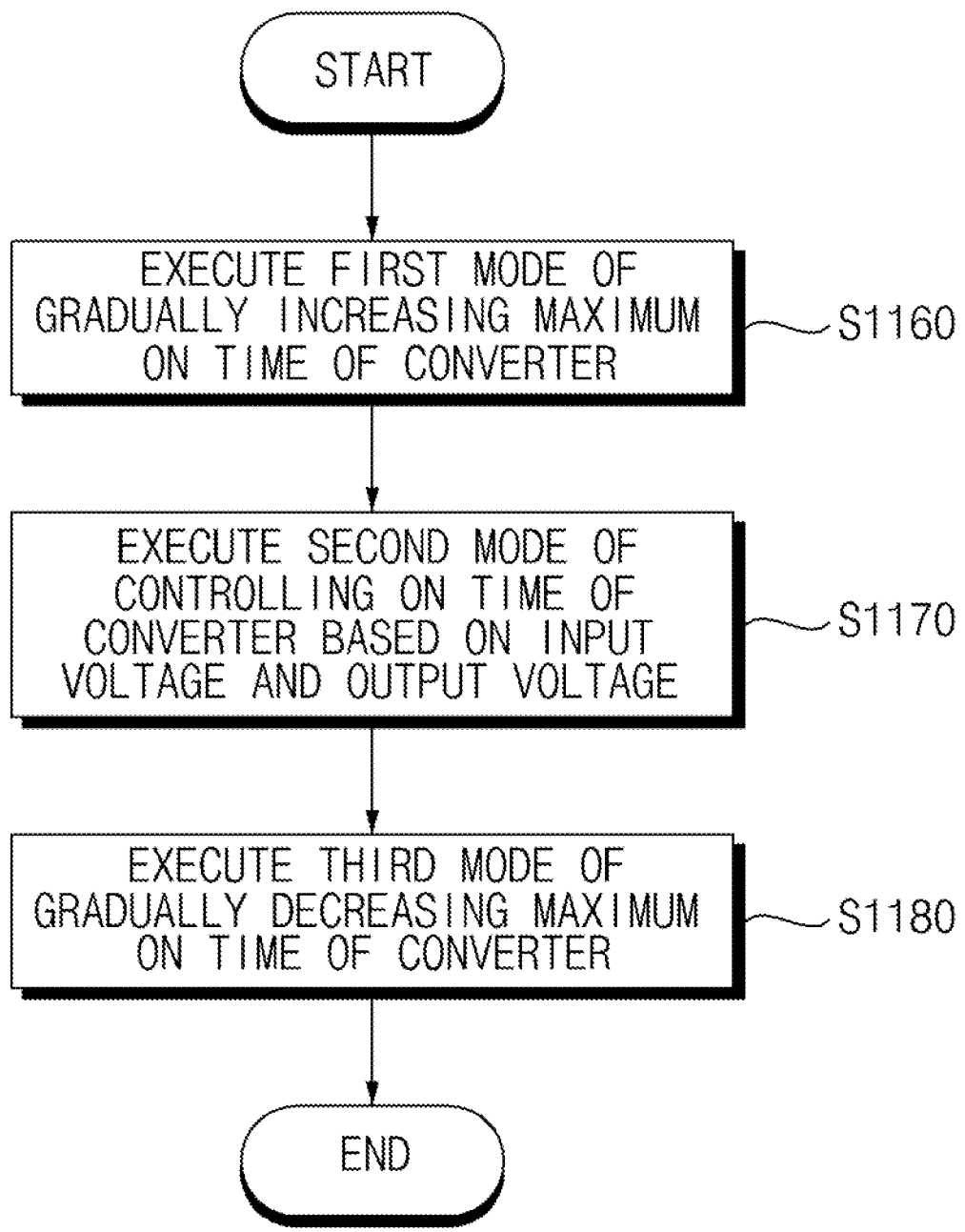
FIG. 11C is a flowchart showing an operation method of an image display apparatus according to a further embodiment of the present disclosure.

FIG. 11C is a flowchart showing an operation method of an image display apparatus according to a further embodiment of the present disclosure.

Referring to the figure, in the image display apparatus according to the further embodiment of the present disclosure, the input voltage detector A in the power supply 190 detects input AC voltage Vacn input to the converter 700, and the output voltage detector B in the power supply 190 detects output voltage Vdc of the output ends of the converter 700.

Meanwhile, the controller 910 in the power supply 190 controls a first mode of gradually increasing the maximum on time of the converter 700 to be executed (S1160).

For example, the controller 910 may control a first mode of gradually increasing the maximum on time of the first switching device Sa based on the input AC voltage to be executed for a first period P1 for which positive-polarity input AC voltage Vacn rises.

As another example, the controller 910 may control a first mode of gradually increasing the maximum on time of the second switching device Sb based on the input AC voltage to be executed for a third period P3 for which negative-polarity input AC voltage Vacn falls.

The first mode at this time may be referred to as a soft-in mode.

The first mode may indicate a mode of slowly increasing and maintaining the maximum on time of the first switching device Sa or the second switching device Sb from the minimum value irrespective of output voltage, as shown in FIG. 13A. Consequently, it is possible to reduce noise at the time of switching the converter 700.

Subsequently, the controller 910 in the power supply 190 controls a second mode of controlling on time of the converter based on the input voltage and the output voltage to be executed (S1170).

For example, the controller 910 may control on time of the first switching device Sa to change based on the input voltage and the output voltage for a period P12 of FIG. 12. As a result, the first switching device Sa may be operated in a critical conduction mode (CRM).

As another example, the controller 910 may control on time of the second switching device Sb to change based on the input voltage and the output voltage for a period P34 of FIG. 12. As a result, the second switching device Sb may be operated in a critical conduction mode (CRM).

Subsequently, the controller 910 in the power supply 190 performs control a third mode of gradually decreasing the maximum on time of the converter 700 to be executed (S1180).

For example, the controller 910 may control a third mode of gradually decreasing the maximum on time of the first switching device Sa based on the input AC voltage to be executed for a second period P2 for which positive-polarity input AC voltage Vacn falls.

As another example, the controller 910 may control a third mode of gradually decreasing the maximum on time of the second switching device Sb based on the input AC voltage to be executed for a fourth period P4 for which negative-polarity input AC voltage Vacn rises.

The third mode at this time may be referred to as a soft-out mode.

The third mode may indicate a mode of slowly decreasing the maximum on time of the first switching device Sa or the second switching device Sb to the minimum value and maintaining the minimum value for a predetermined period irrespective of output voltage, as shown in FIG. 13C. Consequently, it is possible to reduce noise at the time of switching the converter 700.

Meanwhile, referring to FIG. 11C, the controller 910 may control such that the maximum on time of the first switching device Sa is gradually increased based on the input AC voltage Vacn for the first period P1, and may control such that the maximum on time of the first switching device Sa is gradually decreased based on the input AC voltage Vacn for the second period P2. Consequently, it is possible to reduce noise at the time of switching the first switching device Sa.

FIGS. 12 to 16B are diagrams referred to in the description of operation of the converter of FIG. 9.

First, FIG. 12 is a waveform diagram of input voltage, input current, and a switching control signal of the converter according to the embodiment of the present disclosure.

Referring to the figure, in the state in which input AC voltage Vacm having zero crossing points ZCa, ZCb, and ZCc is input to the converter 700 of FIG. 9 at points in time T0, T1, and T2, respectively, the first switching device Sa may repeatedly turn on and off for a period Px12 from a point in time Tx1 to a point in time Tx2 according to a first switching control signal SSan, which is a pulse width modulation signal, and the second switching device Sb may repeatedly turn on and off for a period Px34 from a point in time Tx3 to a point in time Tx4 according to a second switching control signal SSbn, which is a pulse width modulation signal.

Meanwhile, in consideration of the case in which the first switching device Sa is in an off state between the point in time T0 and the point in time Tx1 and the first switching device Sa turns on at the point in time Tx1, the controller 910 controls on time of the first switching device Sa to gradually increase from a first level to a second level for a first period P1 for which input AC voltage Vacn rises after the zero crossing point ZCa. As a result, no instantaneous peak current is generated in an area Ara of input current iacn, whereby it is possible to reduce noise due to the supply of power.

Similarly, in consideration of the case in which the first switching device Sa repeatedly turns on and off between the point in time Tx1 and the point in time Tx2 and the first switching device Sa remains off from the point in time Tx2, the controller 910 controls on time of the first switching device Sa to gradually decrease from the second level to the first level for a second period P2 for which the input AC voltage Vacn falls after a peak point PK. As a result, no instantaneous peak current is generated in an area Arb of the input current iacn, whereby it is possible to reduce noise due to the supply of power.

Meanwhile, in consideration of the case in which the second switching device Sb is in an off state between the point in time Tx2 and the point in time Tx3 and the second switching device Sb turns on at the point in time Tx3, the controller 910 controls on time of the second switching device Sb to gradually increase from a first level to a second level for a third period P3 for which the input AC voltage Vacn falls after the zero crossing point ZCb. As a result, no instantaneous peak current is generated in an area Arc of the input current iacn, whereby it is possible to reduce noise due to the supply of power.

Similarly, in consideration of the case in which the second switching device Sb repeatedly turns on and off between the point in time Tx3 and the point in time Tx4 and the second switching device Sb remains off from the point in time Tx4, the controller 910 performs control on time of the second switching device Sb to gradually decrease from the second level to the first level for a fourth period P4 for which the input AC voltage Vacn rises after the lowest point VA. As a result, no instantaneous peak current is generated in an area Ard of the input current iacn, whereby it is possible to reduce noise due to the supply of power.

Meanwhile, the period between the zero crossing point ZCa and a first reference value vrefa of the input AC voltage Vacn may be the first period P1, the period between the first reference value vrefa and the zero crossing point ZCb of the input AC voltage Vacn may be the second period P2, the period between the zero crossing point ZCb and a second reference value vrefb of the input AC voltage Vacn may be the third period P3, and the period between the second reference value vrefb and the zero crossing point ZCc of the input AC voltage Vacn may be the fourth period P4.

Meanwhile, the controller 910 may control to decrease the rising slope from the first level to the second level or decrease the first level or the second level, as the peak of the input current Iacn corresponding to the input AC voltage Vacn is increased for the first period P1 or the third period P3.

Meanwhile, the controller 910 may control to decrease the rising slope from the first level to the second level or decrease the first level or the second level, as the peak value of the input AC voltage Vacn is increased for the first period P1 or the third period P3.

Meanwhile, the controller 910 may control to decrease the falling slope from the second level to the first level or decrease the first level or the second level, as the peak of the input current Iacn corresponding to the input AC voltage Vacn is increased for the second period P2 or the fourth period P4.

Meanwhile, the controller 910 may control to decrease the falling slope from the second level to the first level or decrease the first level or the second level, as the peak value of the input AC voltage Vacn is increased for the second period P2 or the fourth period P4.

Meanwhile, the controller 910 may control on time of the first switching device Sa to change based on the input voltage and the output voltage for a period P12. As a result, the first switching device Sa may be operated in a critical conduction mode (CRM).

Meanwhile, the controller 910 may control on time of the second switching device Sb to change based on the input voltage and the output voltage for a period P34. As a result, the second switching device Sb may be operated in a critical conduction mode (CRM).

FIG. 13A is a diagram corresponding to the first period P1 or the third period P3 of FIG. 12.

Referring to the figure, the controller 910 may control on time of the first switching device Sa or the second switching device Sb to be maintained at a first level, which is the minimum on time, for the first period P1 or the third period P3 and then to gradually increase from the first level to a second level.

The figure illustrates that on time is maintained at a first level La1, which is the minimum on time, between a point in time Tx1 and a point in time Txa and then gradually increases from the point in time Txa to a point in time Toa, whereby the rising slope thereof is Sla1.

FIG. 13B is a diagram corresponding to the 1-2 period P12 or the 3-4 period P34 of FIG. 12.

Referring to the figure, the controller 910 may control on time of the first switching device Sa or the second switching device Sb to change based on input voltage and output voltage for the 1-2 period P12 or the 3-4 period P34.

In particular, the figure illustrates that on time of the first switching device Sa or the second switching device Sb is a second level La2 for the 1-2 period P12 or the 3-4 period P34. Alternatively, on time of the first switching device Sa or the second switching device Sb may be changed.

FIG. 13C is a diagram corresponding to the second period P2 or the fourth period P4 of FIG. 12.

Referring to the figure, the controller 910 may control on time of the first switching device Sa or the second switching device Sb to gradually decrease from the second level to the first level for the second period P2 or the fourth period P4 and is then maintained at the first level for a predetermined time.

The figure illustrates that on time gradually decreases from the second level La2 to the first level La1 between a point in time Tob and a point in time Txb and is then maintained at the first level La1 between the point in time Txb to a point in time Tx2. At this time, the rising slope is Sla2.

Figure 13D:
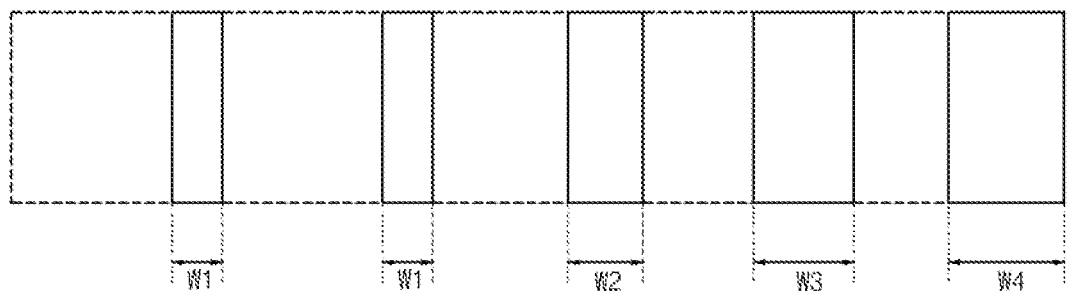
Figure 13E:
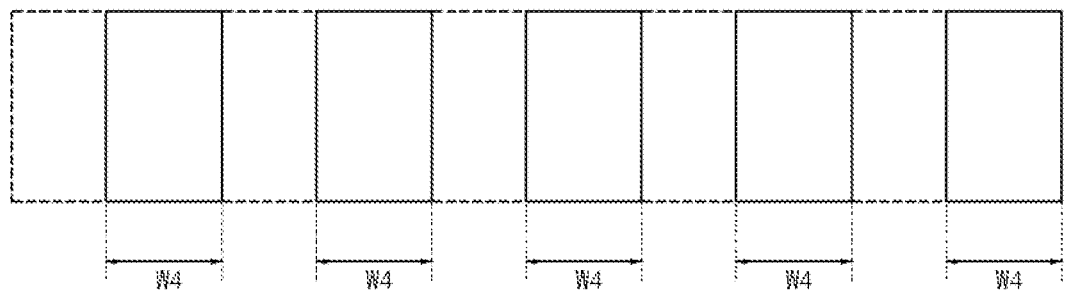

FIGS. 13D to 13E are diagrams illustrating turn on time corresponding to FIGS. 13A to 13C, respectively.

First, FIG. 13D illustrates that, for the first period P1 or the third period P3, on time of the first switching device Sa or the second switching device Sb is a first duty W1, a first duty W1, a second duty W2 greater than the first duty W1, a third duty W3 greater than the second duty W2, and a fourth duty W4 greater than the third duty W3 in order.

Here, the first duty W1 may correspond to the first level La1 of FIG. 13A, and the fourth duty W4 may correspond to the second level La2 of FIG. 13A.

Next, FIG. 13E illustrates that, for the 1-2 period P12 or the 3-4 period P34, on time of the first switching device Sa or the second switching device Sb is uniformly a fourth duty W4.

Meanwhile, unlike the figure, on time of the first switching device Sa or the second switching device Sb may be changed based on input voltage and output voltage for the 1-2 period P12 or the 3-4 period P34.

Figure 13F:
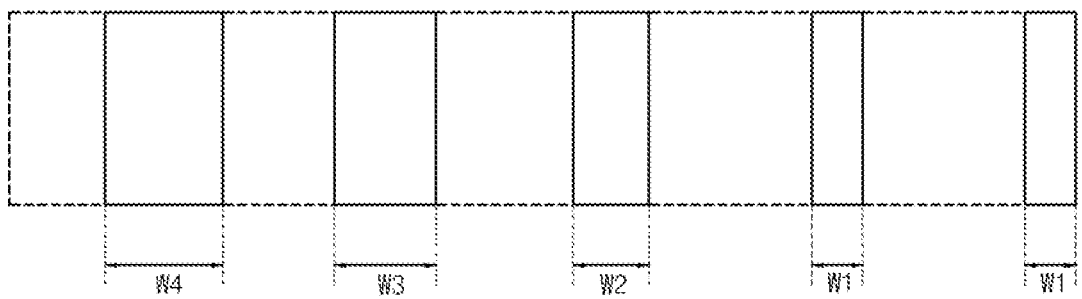

Next, FIG. 13F illustrates that, for the second period P2 or the fourth period P4, on time of the first switching device Sa or the second switching device Sb is a fourth duty W4, a third duty W3 less than the fourth duty W4, a second duty W2 less than the third duty W3, a first duty W1 less than the second duty W2, and a first duty W1 in order.

Here, the first duty W1 may correspond to the first level La1 of FIG. 13C, and the fourth duty W4 may correspond to the second level La2 of FIG. 13C.

Figure 14A:
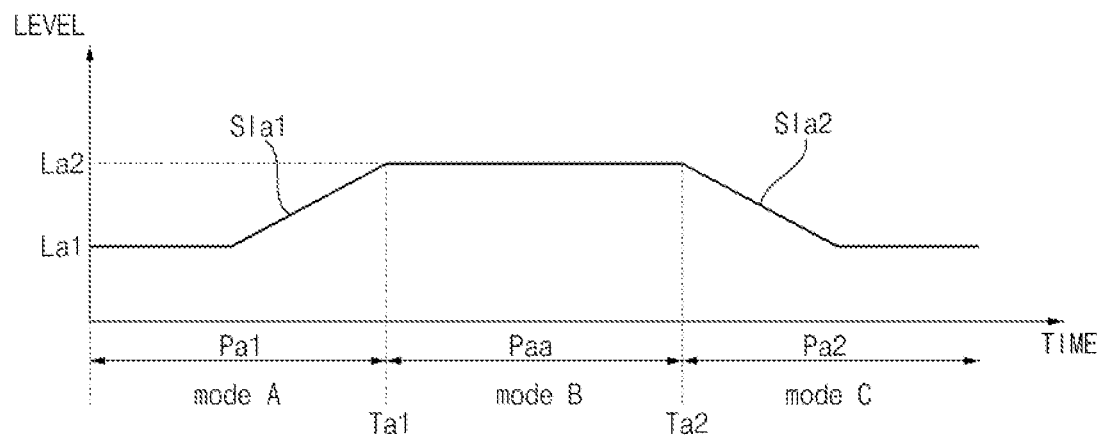

FIG. 14A is a diagram showing an example of on time of a first switching device Sa corresponding to positive-polarity input AC voltage.

Referring to the figure, on time of the first switching device Sa may gradually increase from a first level La1 to a second level La2 for a first period Pa1 for which input AC voltage Vacn rises after a zero crossing point ZCa.

That is, turn on time may be gradually increased to a point in time Ta1 at a slope of Sla1.

Meanwhile, the point in time Ta1 may correspond to a point in time at which the input AC voltage Vacn reaches a first reference value refa.

Next, for a period Paa for which the input AC voltage Vacn rises from the first reference value refa, passes through a peak point, falls, and reaches the first reference value refa again, on time of the first switching device Sa may be maintained at the second level La2.

Meanwhile, unlike the figure, on time of the first switching device Sa may be changed based on output voltage and input voltage for the period Paa.

Next, on time of the first switching device Sa may gradually decrease from the second level La2 to the first level La1 for a second period Pa2 for which the input AC voltage Vacn falls after the peak point PK.

That is, turn on time may be gradually decreased from a point in time Ta2 at a slope of Sla2.

Meanwhile, the controller 910 may control to increase the rising slope or the falling slope, as the peak of input current Iacn corresponding to the input AC voltage Vacn is decreased or the peak value of the input AC voltage Vacn is decreased.

Figure 14B:
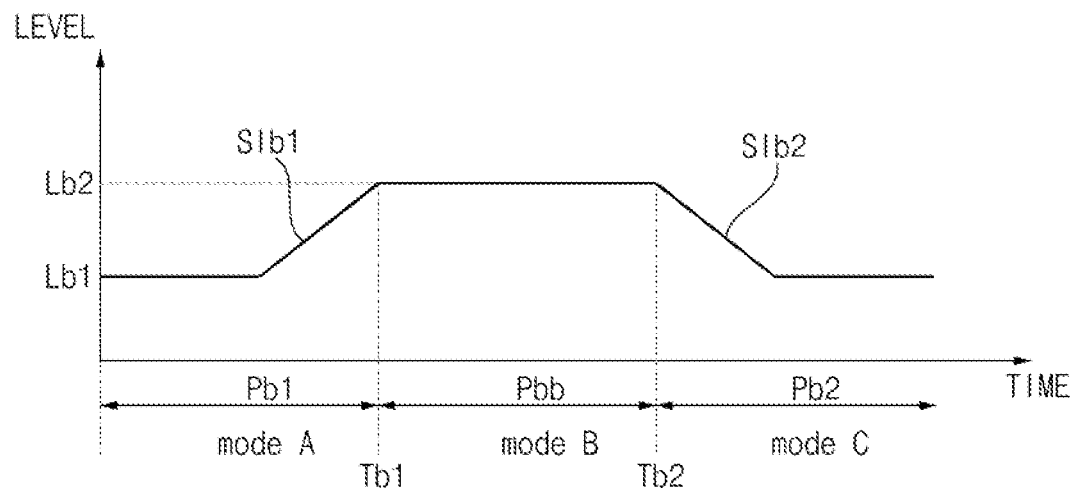

FIG. 14B is similar to FIG. 14A except for the slope of on time.

Referring to the figure, on time of a first switching device Sb may gradually increase from a first level Lb1 to a second level Lb2 for a first period Pb1 for which input AC voltage Vbcn rises after a zero crossing point ZCb.

That is, turn on time may be gradually increased to a point in time Tb1 at a slope of Slb1 greater than the slope of Sla1.

Meanwhile, the point in time Tb1 may correspond to a point in time at which the input AC voltage Vbcn reaches a first reference value refa.

Next, for a period Pbb for which the input AC voltage Vbcn rises from the first reference value refa, passes through a peak point, falls, and reaches the first reference value refa again, on time of the first switching device Sb may be maintained at the second level Lb2.

Meanwhile, unlike the figure, on time of the first switching device Sb may be changed based on output voltage and input voltage for the period Pbb.

Next, on time of the first switching device Sb may gradually decrease from the second level Lb2 to the first level Lb1 for a second period Pb2 for which the input AC voltage Vbcn falls after the peak point PK.

That is, turn on time may be gradually decreased from a point in time Tb2 at a slope of Slb2 greater than the slope of Sla1.

Meanwhile, the controller 910 may control to increase the rising slope or the falling slope, as the peak of input current Ibcn corresponding to the input AC voltage Vbcn is decreased or the peak value of the input AC voltage Vbcn is decreased.

Figure 14C:
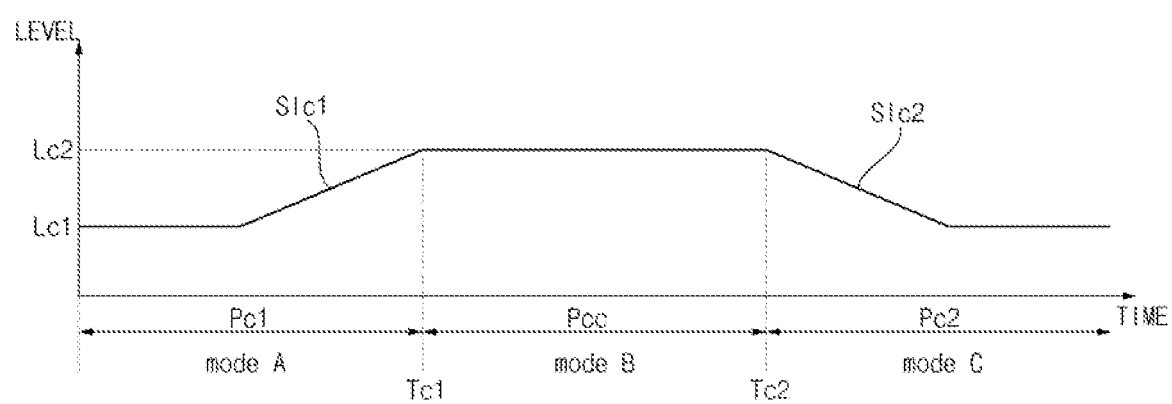

FIG. 14C is similar to FIG. 14A except for the slope of on time.

Referring to the figure, on time of a first switching device Sc may gradually increase from a first level Lc1 to a second level Lc2 for a first period Pc1 for which input AC voltage Vccn rises after a zero crossing point ZCc.

That is, turn on time may be gradually increased to a point in time Tc1 at a slope of Slc1 less than the slope of Sla1.

Meanwhile, the point in time Tc1 may correspond to a point in time at which the input AC voltage Vccn reaches a first reference value refa.

Next, for a period Pcc for which the input AC voltage Vccn rises from the first reference value refa, passes through a peak point, falls, and reaches the first reference value refa again, on time of a first switching device Sc may be maintained at the second level Lc2.

Meanwhile, unlike the figure, on time of the first switching device Sc may be changed based on output voltage and input voltage for the period Pcc.

Next, on time of the first switching device Sc may gradually decrease from the second level Lc2 to the first level Lc1 for a second period Pc2 for which the input AC voltage Vccn falls after the peak point PK.

That is, turn on time may be gradually decreased from a point in time Tc2 at a slope of Slc2 greater than the slope of Sla1.

Meanwhile, the controller 910 may control to increase the rising slope or the falling slope, as the peak of input current Iccn corresponding to the input AC voltage Vccn is decreased or the peak value of the input AC voltage Vccn is decreased.

FIG. 15A is a diagram illustrating that peak values of input AC voltage are different from each other.

Referring to the figure, in the case in which the peak value of input AC voltage Vacka is Pka, as shown in FIG. 15A(a), the controller 910 may control such that the rising slope of the first switching device Sa from the first level to the second level is Sla1 or the falling slope of the first switching device Sa from the second level to the first level is Sla2, as shown in FIG. 14A.

Next, in the case in which the peak value of input AC voltage Vackb is Pkb greater than Pka, as shown in FIG. 15A(b), the controller 910 may control such that the rising slope of the first switching device Sa from the first level to the second level is Slc1, which is less than Sla1, or the falling slope of the first switching device Sa from the second level to the first level is Slc2, which is less than Sla2, as shown in FIG. 14C.

FIG. 15B illustrates a black image and a white image.

Referring to the figure, in the case in which the display 180 displays a black image 1410, as shown in FIG. 15B(a), the controller 910 may control such that the rising slope of the first switching device Sa from the first level to the second level is Slb1 or the falling slope of the first switching device Sa from the second level to the first level is Slb2, as shown in FIG. 14B.

Next, in the case in which the display 180 displays a white image 1420, as shown in FIG. 15B(b), the controller 910 may control such that the rising slope of the first switching device Sa from the first level to the second level is Slc1, which is less than Slb1, or the falling slope of the first switching device Sa from the second level to the first level is Slc2, which is less than S1b2, as shown in FIG. 14C.

Figure 15C:
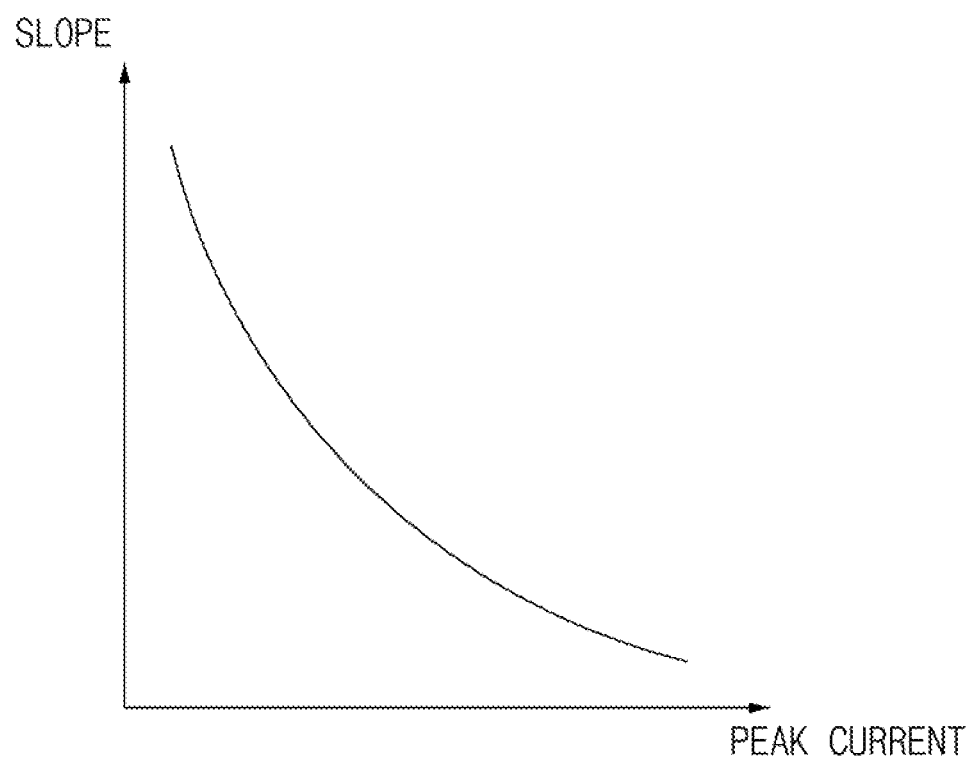

That is, the controller 910 may control to decrease the rising slope from the first level to the second level or decrease the second level, as the peak of the input current Iacn corresponding to the input AC voltage Vacn is increased, as shown in FIG. 15C.

Figure 15D:
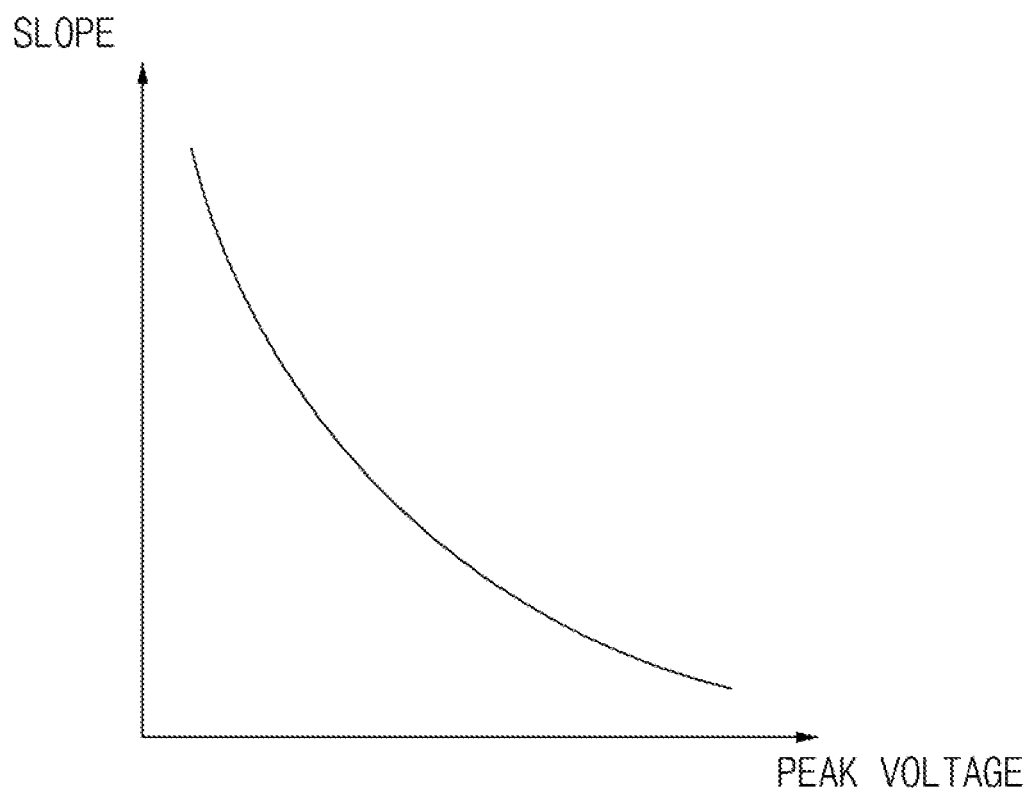

Meanwhile, the controller 910 may control to decrease the rising slope from the first level to the second level or decrease the first level or the second level, as the peak value of the input AC voltage Vacn is increased, as shown in FIG. 15D.

Figure 15E:
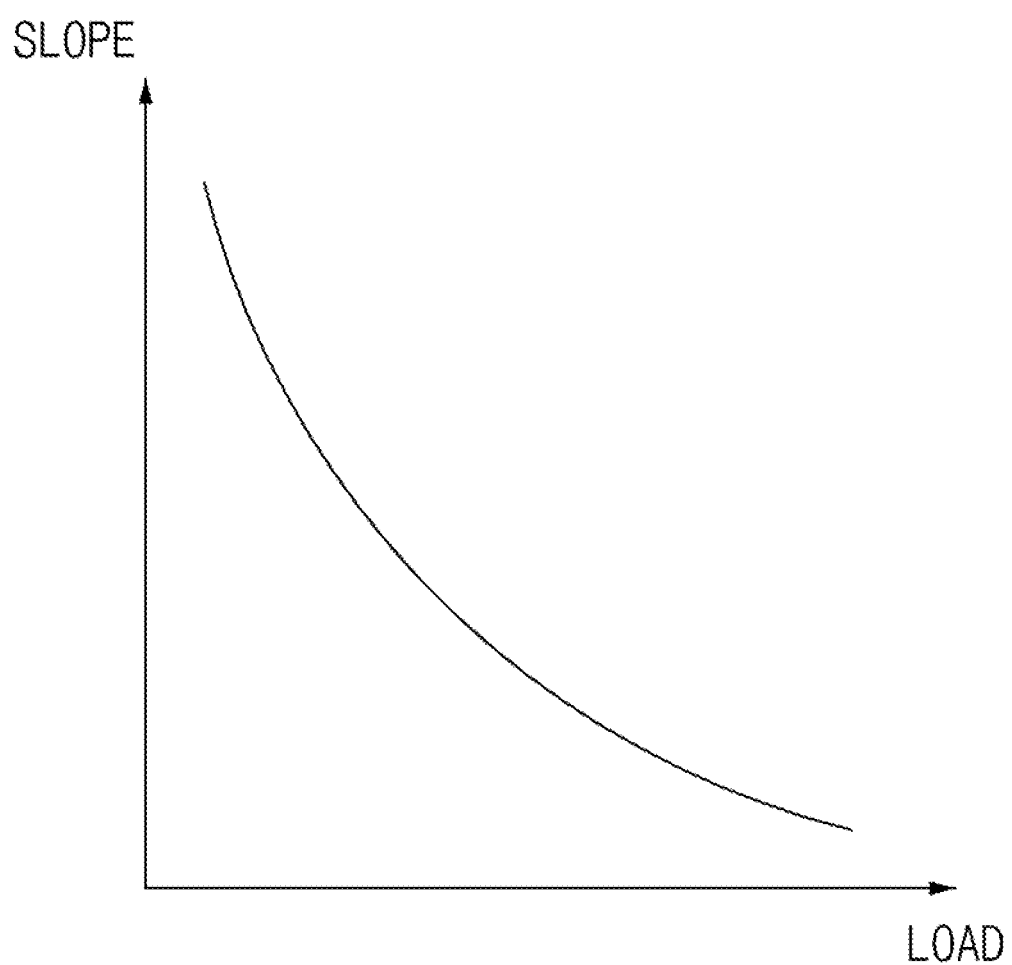

Meanwhile, the controller 910 may control to decrease the rising slope from the first level to the second level or decrease the first level or the second level, as power consumption of the load LOAD connected to the output ends of the converter 700 is increased, as shown in FIG. 15E.

Figure 15F:
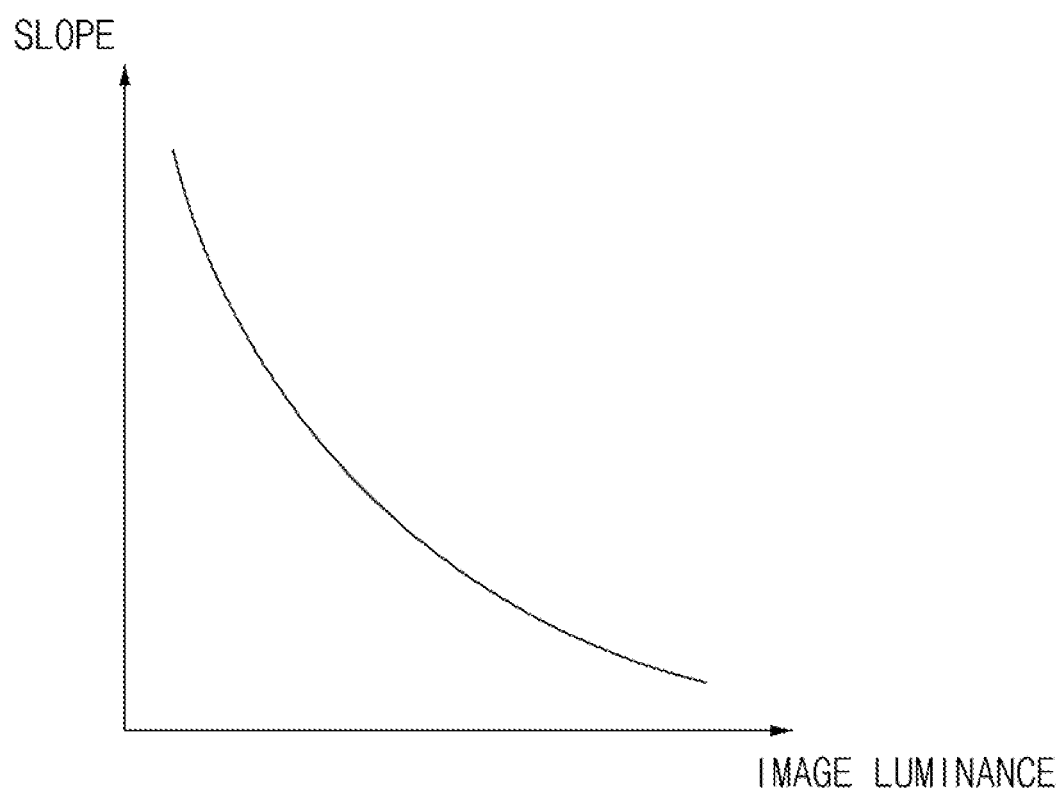

Meanwhile, the controller 910 may control to decrease the rising slope from the first level to the second level or decrease the first level or the second level, as the luminance of an image displayed on the display 180 is increased, as shown in FIG. 15F.

Figure 16A:
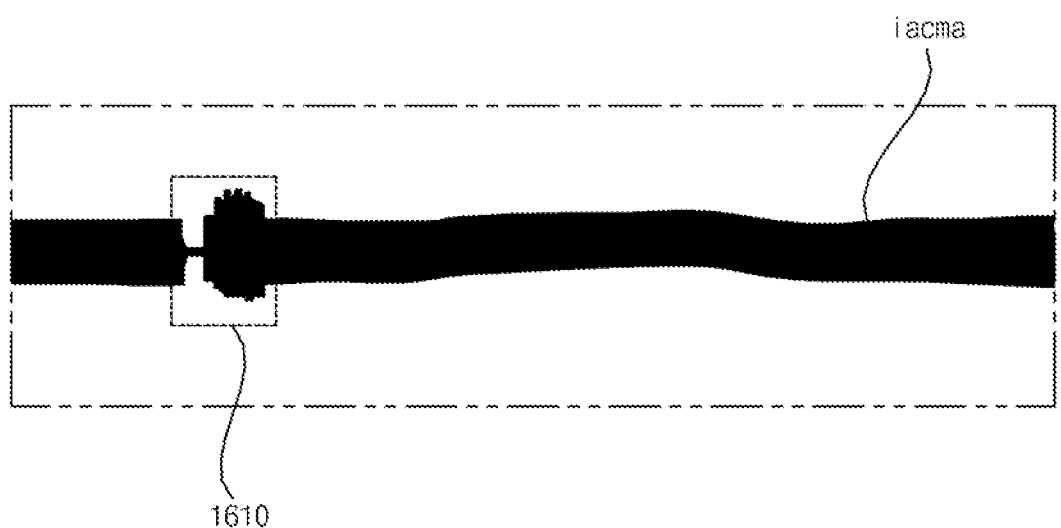
Figure 16B:
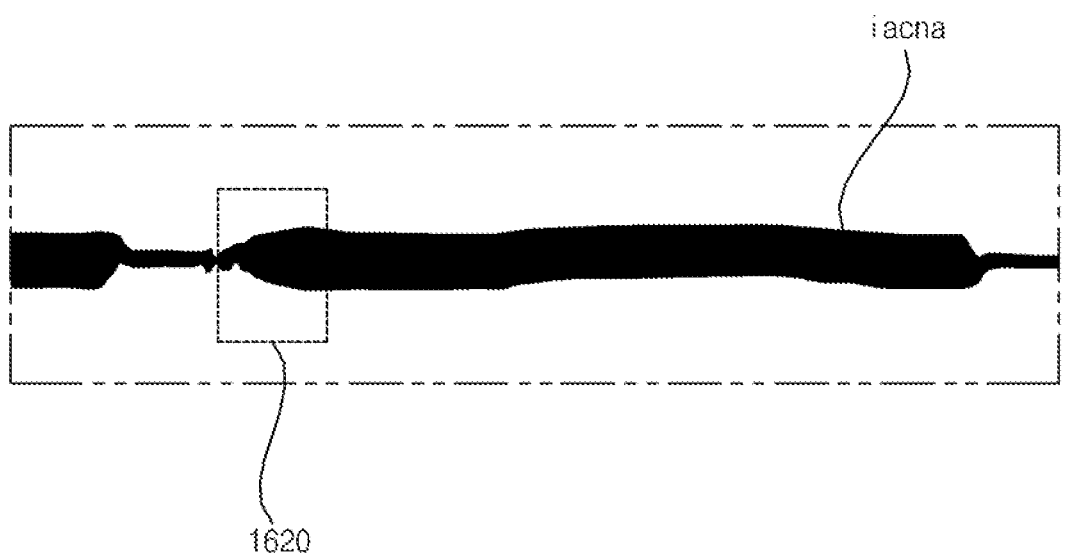

FIG. 16A is a diagram illustrating an input current waveform iacma corresponding to FIG. 10, and FIG. 16B is a diagram illustrating an input current waveform iacna corresponding to FIG. 12.

Referring to FIG. 16A, peak current is generated and thus noise is generated due to switching of the first switching device Sa or the second switching device Sb in the vicinity of off time, as indicated by an area 1610 of the figure.

Meanwhile, according to switching in the converter 700 according to the embodiment of the present disclosure, peak current is hardly generated and thus noise is hardly generated, as indicated by an area 1610 of the figure, although switching of the first switching device Sa or the second switching device Sb is performed in the vicinity of off time, as shown in FIG. 16B.

Meanwhile, the operation of the power supply 190 in FIGS. 8 to 16B is equally applicable to an organic light emitting diode panel 210b or an inorganic light emitting diode panel in addition to the liquid crystal display panel 210.

Hereinafter, a display 180 including an organic light emitting diode panel will be described.

Figure 17:
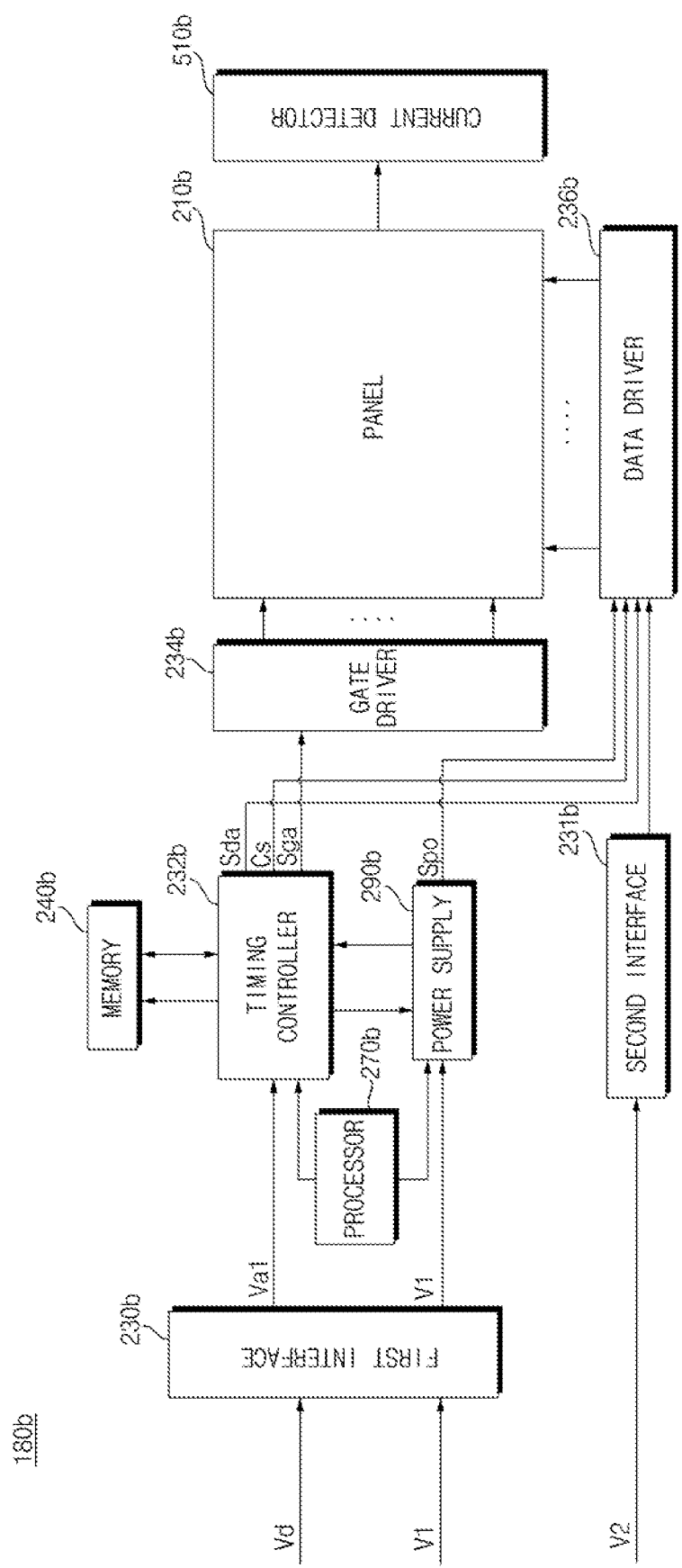
FIG. 17 is another example of an internal block diagram of a display of FIG. 2.

FIG. 17 is another example of an internal block diagram of the display of FIG. 2.

Referring to the figure, an organic light emitting diode panel-based display 180b may include an organic light emitting diode panel 210b, a first interface 230b, a second interface 231b, a timing controller 232b, a gate driver 234b, a data driver 236b, a memory 240b, a processor 270b, a power supply 290b, and a current detector 510b.

The display 180b receives an image signal Vdb, first DC voltage V1b, and second DC voltage V2b, and may display a predetermined image based on the image signal Vdb.

Meanwhile, the first interface 230b in the display 180b may receive the image signal Vdb and the first DC voltage V1b from the signal processor 170b.

Here, the first DC voltage V1b may be used for the operation of the power supply 290b and the timing controller 232b in the display 180b.

Next, the second interface 231b may receive second DC voltage V2b from an external power supply 190b. Meanwhile, the second DC voltage V2b may be input to the data driver 236b in the display 180b.

The timing controller 232b may output a data driving signal Sdab and a gate driving signal Sgab based on the image signal Vdb.

For example, when the first interface 230b converts the input image signal Vdb and outputs the converted image signal va1b, the timing controller 232b may output the data driving signal Sdab and the gate driving signal Sgab based on the converted image signal va1b.

The timing controller 232b may further receive a control signal, a vertical synchronization signal Vsyncb, and the like, in addition to the image signal Vdb from the signal processor 170b.

The timing controller 232b generates a gate driving signal Sgab for the operation of the gate driver 234b and a data driving signal Sdab for the operation of the data driver 236b based on the control signal, the vertical synchronization signal Vsyncb, and the like, in addition to the image signal Vdb.

At this time, when the panel 210b includes RGBW subpixels, the data driving signal Sdab may be a data driving signal for driving of the RGBW subpixels.

Meanwhile, the timing controller 232b may further output a control signal Csb to the gate driver 234b.

The gate driver 234b and the data driver 236b supply a scan signal and an image signal to the organic light emitting diode panel 210b through gate lines GLb and data lines DLb, respectively, according to the gate driving signal Sgab and the data driving signal Sdab from the timing controller 232b. Accordingly, the organic light emitting diode panel 210b displays a predetermined image.

Meanwhile, the organic light emitting diode panel 210b may include an organic light emitting layer. In order to display an image, a plurality of gate lines GL and data lines DL may be disposed so as to intersect each other in a matrix form at each pixel corresponding to the organic light emitting layer.

Meanwhile, the data driver 236b may output a data signal to the organic light emitting diode panel 210b based on second DC voltage V2b from the second interface 231b.

The power supply 290b may supply various kinds of power to the gate driver 234b, the data driver 236b, the timing controller 232b, and the like.

The current detector 510b may detect the current flowing in a sub-pixel of the organic light emitting diode panel 210b. The detected current may be input to the processor 270b or the like for cumulative current calculation.

The processor 270b may perform various kinds of control in the display 180b. For example, the processor 270b may control the gate driver 234b, the data driver 236b, the timing controller 232b, and the like.

Meanwhile, the processor 270b may receive current information flowing in a sub-pixel of the organic light emitting diode panel 210b from the current detector 510b.

Figure 18A:
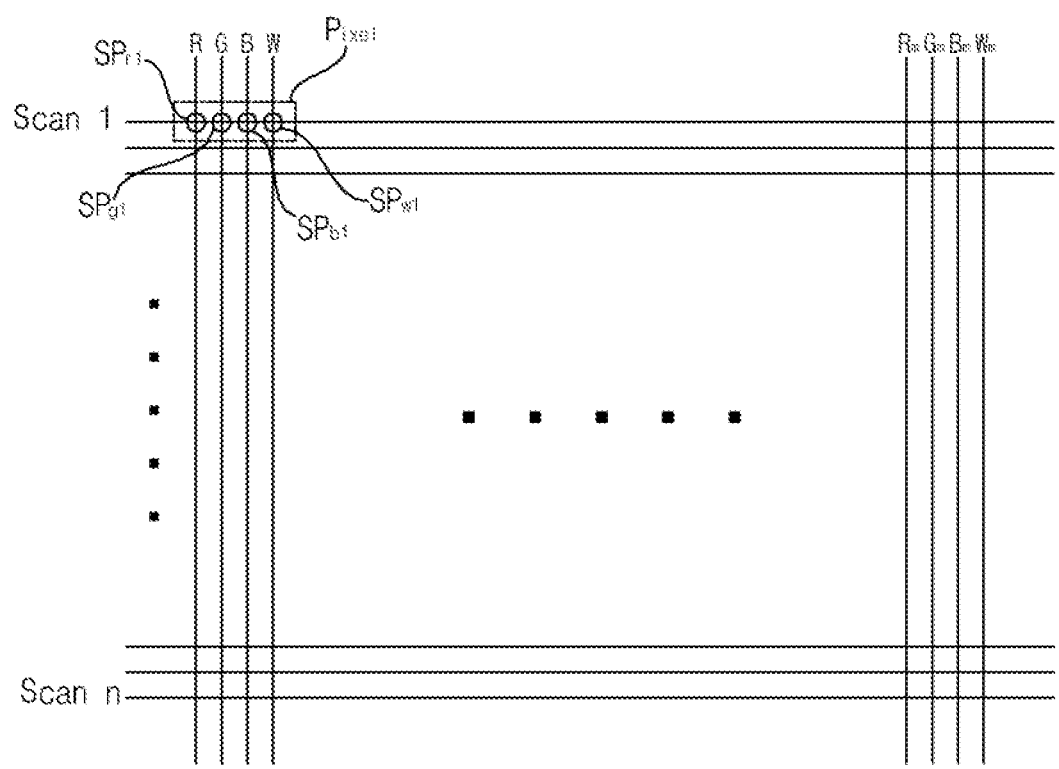
FIGS. 18A and 18B are diagrams referred to in the description of an organic light emitting diode panel of FIG. 17.
Figure 18B:
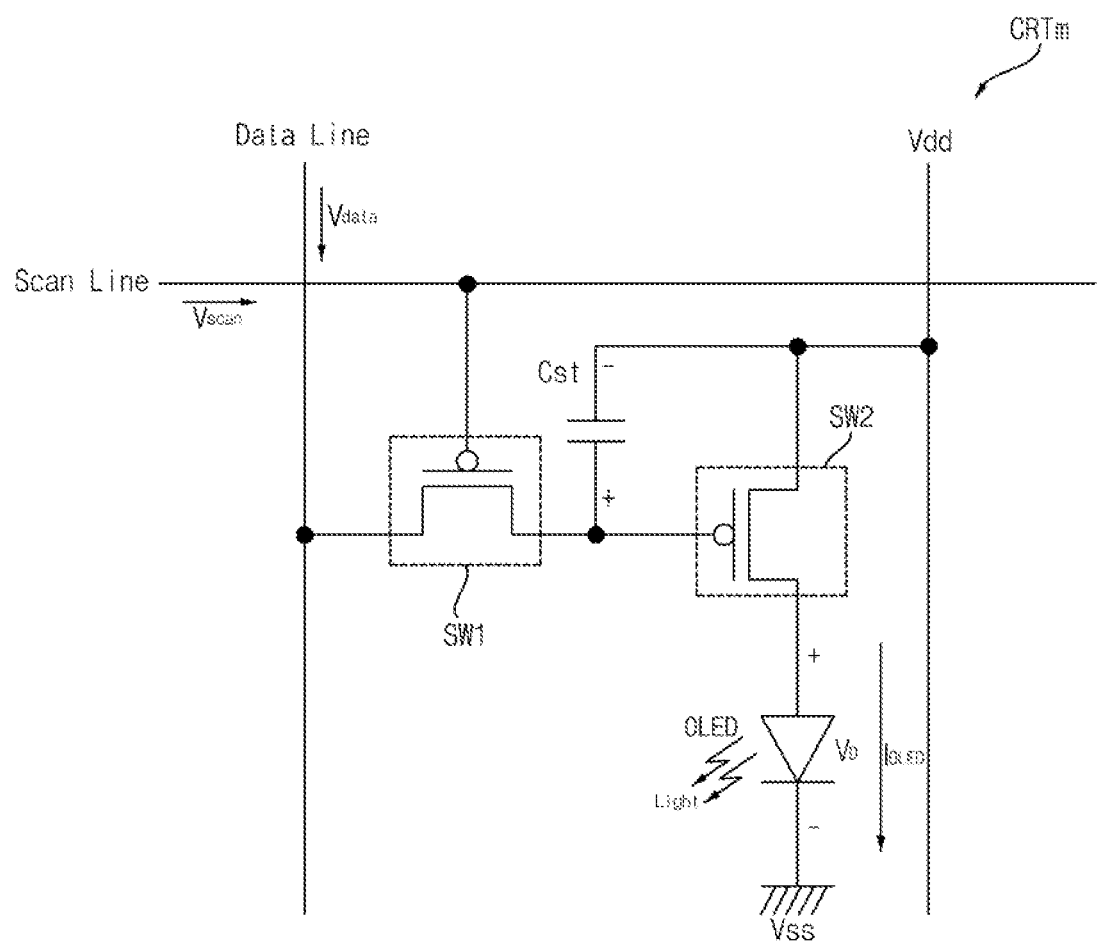

FIGS. 18A and 18B are diagrams referred to in the description of the organic light emitting diode panel of FIG. 17.

First, FIG. 18A is a diagram illustrating a pixel in the organic light emitting diode panel 210b.

Referring to the figure, the organic light emitting diode panel 210b may include a plurality of scan lines Scan1 to Scann and a plurality of data lines R1, G1, B1, and W1 to Rm, Gm, Bm, and Wm intersecting the scan lines.

Meanwhile, a pixel (subpixel) is defined in an intersecting area of the scan line and the data line in the organic light emitting diode panel 210b. In the drawing, a pixel including sub-pixels SR1, SG1, SB1 and SW1 of RGBW is shown.

FIG. 18B illustrates a circuit of any one sub-pixel in the pixel of the organic light emitting diode panel of FIG. 18A.

Referring to the figure, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC voltage (Vdd) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

As is apparent from the above description, an image display apparatus according to an embodiment of the present disclosure includes a display and a power supply configured to supply driving voltage to the display, wherein the power supply includes a converter to convert input AC voltage into DC voltage and a controller to control the converter, wherein the converter includes a first leg including a first switching device and a second switching device connected to each other in series and a second leg including a first diode and a second diode connected to each other in series, the first diode and the second diode connected to the first leg in parallel, and wherein the controller controls on time of the first switching device to gradually increase from a first level to a second level for a first period for which the input AC voltage rises after a zero crossing point. Consequently, it is possible to reduce noise due to the supply of power. In particular, it is possible to reduce noise at the time of switching the converter configured to supply power to the display.

The controller may control on time of the first switching device to gradually decrease from the second level to the first level for a second period for which the input AC voltage falls after a peak point. Consequently, it is possible to reduce noise due to the supply of power.

The controller may control on time of the second switching device to gradually increase from the first level to the second level for a third period for which the input AC voltage falls after a zero crossing point. Consequently, it is possible to reduce noise due to the supply of power.

The controller may control on time of the second switching device to gradually decrease from the second level to the first level for a fourth period for which the input AC voltage rises after the lowest point. Consequently, it is possible to reduce noise due to the supply of power.

The power supply may further include an input voltage detector to detect the input AC voltage and an output voltage detector to detect output voltage of the converter, and the controller may control the on time of the first switching device to change based on the input AC voltage and the output voltage for a period between the first period and the second period. Consequently, it is possible to reduce noise due to the supply of power.

The controller may control the on time of the first switching device to decrease as the peak level of the input AC voltage increases. Consequently, it is possible to reduce noise due to an increase in the level of the input AC voltage.

The controller may control the on time of the first switching device to decrease, as the level of output voltage of the converter decreases. Consequently, it is possible to reduce noise due to the supply of power.

The power supply may further include an input voltage detector to detect the input AC voltage and an output voltage detector to detect output voltage of the converter, and the controller may control the on time of the second switching device to change based on the input AC voltage and the output voltage for a period between the third period and the fourth period. Consequently, it is possible to reduce noise due to the supply of power.

The controller may control to decrease the rising slope from the first level to the second level or decrease the second level, as the peak of input current corresponding to the input AC voltage increases for the first period. Consequently, it is possible to reduce noise due to an increase in the peak of input current.

The controller may control to decrease the rising slope from the first level to the second level or decrease the second level, as the peak value of the input AC voltage increases. Consequently, it is possible to reduce noise due to an increase in the peak value of the input AC voltage.

The controller may control the rising slope from the first level to the second level or the second level when a white image is displayed on the display to be less than the rising slope from the first level to the second level or the second level when a black image is displayed on the display. Consequently, it is possible to reduce noise due to the supply of power at the time of displaying a white image having greater power consumption.

The controller may control to decrease the rising slope from the first level to the second level or decrease the second level, as luminance of an image displayed on the display increases. Consequently, it is possible to reduce noise due to an increase in luminance of an image.

A load including the display may be connected to an output end of the converter, and the controller may control to decrease the rising slope from the first level to the second level or decrease the second level, as power consumption of the load increases. Consequently, it is possible to reduce noise due to an increase in power consumption of the load.

The power supply may further include a DC/DC converter connected to the output end of the converter, the DC/DC converter being configured to convert the level of DC voltage, and the load may include a DC/DC converter and the display. Consequently, the converter is capable of supplying various levels of voltage to the load.

The controller may calculate the maximum on time of the first switching device based on the input AC voltage, may calculate the on time of the first switching device based on output voltage of an output end of the converter, and may output a first switching control signal for driving the first switching device based on the maximum on time and the on time. Consequently, switching of the converter is performed based on the input AC voltage and the output voltage of the converter, whereby it is possible to reduce noise due to the supply of power.

The controller may output the first switching control signal for driving the first switching device based on the on time in case in which the maximum on time is greater than the on time, and may output the first switching control signal for driving the first switching device based on the maximum on time in case in which the on time is greater than the maximum on time. Consequently, switching of the converter is performed based on the maximum on time or the on time, whereby it is possible to reduce noise due to the supply of power.

The controller may control maximum on time of the first switching device to gradually increase based on the input AC voltage for the first period, and may control the maximum on time of the first switching device to gradually decrease based on the input AC voltage for the second period. Consequently, switching of the converter is performed based on the input AC voltage, whereby it is possible to reduce noise due to the supply of power.

The controller may control the on time of the first switching device based on the input AC voltage and output voltage of an output end of the converter for a period between the first period and the second period. Consequently, it is possible to perform switching of the converter according to a normal mode based on the input AC voltage and the output voltage of the output end of the converter.

The display may include a liquid crystal panel and a backlight including a plurality of light sources configured to emit light to the liquid crystal panel. Consequently, it is possible to reduce noise at the time of switching the converter configured to supply power to the display including the liquid crystal panel and the plurality of light sources.

The display may include an organic light emitting diode panel including a plurality of light sources. Consequently, it is possible to reduce noise at the time of switching the converter configured to supply power to the display including the organic light emitting diode panel.

An image display apparatus according to another embodiment of the present disclosure includes a display and a power supply configured to supply driving voltage to the display, wherein the power supply includes a converter to convert input AC voltage into DC voltage and a controller to control the converter, wherein the converter includes a first leg including a first switching device and a second switching device connected to each other in series and a second leg including a first diode and a second diode connected to each other in series, the first diode and the second diode connected to the first leg in parallel, and wherein the controller is configured to calculate the maximum on time of the first switching device based on the input AC voltage, to calculate on time of the first switching device based on output voltage of an output end of the converter, and to output a first switching control signal for driving the first switching device based on the maximum on time and the on time. Consequently, it is possible to reduce noise due to the supply of power. In particular, it is possible to reduce noise at the time of switching the converter configured to supply power to the display.

An image display apparatus according to a further embodiment of the present disclosure includes a display and a power supply configured to supply driving voltage to the display, wherein the power supply includes a converter to convert input AC voltage into DC voltage and a controller to control the converter, wherein the converter includes a first leg including a first switching device and a second switching device connected to each other in series and a second leg including a first diode and a second diode connected to each other in series, the first diode and the second diode connected to the first leg in parallel, and wherein the controller is configured to control the maximum on time of the first switching device to gradually increase for a first period for which the positive-polarity input AC voltage rises and to control the maximum on time of the first switching device to gradually decrease based on the input AC voltage for a second period for which the positive-polarity input AC voltage falls. Consequently, it is possible to reduce noise due to the supply of power. In particular, it is possible to reduce noise at the time of switching the converter configured to supply power to the display.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made herein without departing from the subject matter and scope of the present disclosure.

What is claimed is:

1. An image display apparatus comprising:
a display; and
a power supply configured to supply a driving voltage to the display,
wherein the power supply comprises:
a converter to convert an input alternating current (AC) voltage into a direct current (DC) voltage; and
a controller to control the converter,
wherein the converter comprises:
a first leg comprising a first switching device and a second switching device connected in series with the first switching device; and
a second leg comprising a first diode and a second diode connected in series with the first diode,
wherein the second leg is connected in parallel with the first leg, and
wherein the controller is configured to control an on time of the first switching device to gradually increase from a first level to a second level for a first period for which the input AC voltage rises after a zero crossing point.

2. The image display apparatus of claim 1, wherein the controller is further configured to control the on time of the first switching device to gradually decrease from the second level to the first level for a second period for which the input AC voltage falls after a peak point.

3. The image display apparatus of claim 2, wherein the power supply further comprises:
an input voltage detector to detect the input AC voltage; and
an output voltage detector to detect an output voltage of the converter,
wherein the controller is further configured to control the on time of the first switching device to change based on the input AC voltage and the output voltage for a period between the first period and the second period.

4. The image display apparatus of claim 2, wherein the controller is further configured to:
control a maximum on time of the first switching device to gradually increase based on the input AC voltage for the first period; and
control the maximum on time of the first switching device to gradually decrease based on the input AC voltage for the second period.

5. The image display apparatus of claim 4, wherein the controller is further configured to control the on time of the first switching device based on the input AC voltage and an output voltage of the converter for a period between the first period and the second period.

6. The image display apparatus of claim 1, wherein the controller is further configured to control an on time of the second switching device to gradually increase from the first level to the second level for a third period for which the input AC voltage falls after a zero crossing point.

7. The image display apparatus of claim 6, wherein the controller is further configured to control the on time of the second switching device to gradually decrease from the second level to the first level for a fourth period for which the input AC voltage rises after a lowest point.

8. The image display apparatus of claim 7, wherein the power supply further comprises:
an input voltage detector to detect the input AC voltage; and
an output voltage detector to detect an output voltage of the converter,
wherein the controller is further configured to control the on time of the second switching device to change based on the input AC voltage and the output voltage for a period between the third period and the fourth period.

9. The image display apparatus of claim 1, wherein the controller is further configured to control the on time of the first switching device to decrease, as a peak level of the input AC voltage increases.

10. The image display apparatus of claim 1, wherein the controller is further configured to control the on time of the first switching device to decrease, as a level of an output voltage of the converter decreases.

11. The image display apparatus of claim 1, wherein the controller is further configured to decrease a rising slope from the first level to the second level or decrease the second level, as a peak of an input current corresponding to the input AC voltage increases for the first period.

12. The image display apparatus of claim 1, wherein the controller is further configured to decrease a rising slope from the first level to the second level or decrease the second level, as a peak value of the input AC voltage increases.

13. The image display apparatus of claim 1, wherein, when a white image is displayed at the display, the controller is further configured to decrease a rising slope from the first level to the second level, or wherein, when a black image is displayed at the display, the controller is further configured to decrease the second level.

14. The image display apparatus of claim 1, wherein the controller is further configured to decrease a rising slope from the first level to the second level or decrease the second level, as a luminance of an image displayed at the display increases.

15. The image display apparatus of claim 1, wherein:
a load comprising the display is connected to an output end of the converter; and
the controller is further configured to decrease a rising slope from the first level to the second level or decrease the second level, as a power consumption of the load increases.

16. The image display apparatus of claim 1, wherein the controller is further configured to:
calculate a maximum on time of the first switching device based on the input AC voltage;
calculate the on time of the first switching device based on an output voltage of the converter; and
output a first switching control signal for driving the first switching device based on the maximum on time and the on time.

17. The image display apparatus of claim 16, wherein the controller is further configured to:
output the first switching control signal for driving the first switching device based on the on time in response to the maximum on time being greater than the on time; and output the first switching control signal for driving the first switching device based on the maximum on time in response to the on time being greater than the maximum on time.

18. An image display apparatus comprising:
a display; and
a power supply configured to supply a driving voltage to the display,
wherein the power supply comprises:
a converter to convert an input alternating current (AC) voltage into a direct current (DC) voltage; and
a controller to control the converter,
wherein the converter comprises:
a first leg comprising a first switching device and a second switching device connected to in series with the first switching device; and
a second leg comprising a first diode and a second diode connected in series with the first diode,
wherein the second leg is connected in parallel with the first leg, and
wherein the controller is configured to:
calculate a maximum on time of the first switching device based on the input AC voltage;
calculate an on time of the first switching device based on an output voltage of the converter; and
output a first switching control signal for driving the first switching device based on the maximum on time and the on time.

19. The image display apparatus of claim 18, wherein the controller is further configured to:
output the first switching control signal for driving the first switching device based on the on time in response to the maximum on time being greater than the on time; and
output the first switching control signal for driving the first switching device based on the maximum on time in response to the on time being greater than the maximum on time.

20. An image display apparatus comprising:
a display; and
a power supply configured to supply a driving voltage to the display,
wherein the power supply comprises:
a converter to convert an input alternating current (AC) voltage into a direct current (DC) voltage; and
a controller to control the converter,
wherein the converter comprises:
a first leg comprising a first switching device and a second switching device connected in series with the first switching device; and
a second leg comprising a first diode and a second diode connected in series with the first diode,
wherein the second leg is connected in parallel with the first leg, and
wherein the controller is configured to:
control a maximum on time of the first switching device to gradually increase for a first period for which a positive-polarity of the input AC voltage rises; and
control the maximum on time of the first switching device to gradually decrease based on the input AC voltage for a second period for which the positive-polarity of the input AC voltage falls.

* * * * *